United States Patent
Mumm

(10) Patent No.: US 12,552,849 B2
(45) Date of Patent: Feb. 17, 2026

(54) METHOD OF REDUCING BISPECIFIC T CELL ENGAGER OR CHIMERIC ANTIGEN RECEPTOR T CELL MEDIATED CYTOKINE RELEASE SYNDROME USING INTERLEUKINS-4, -10, OR A FUSION PROTEIN THEREOF

(71) Applicant: Deka Biosciences, Inc., Germantown, MD (US)

(72) Inventor: John Mumm, Germantown, MD (US)

(73) Assignee: Deka Biosciences, Inc., Germantown, MD (US)

( * ) Notice: Subject to any disclaimer, the term of this patent is extended or adjusted under 35 U.S.C. 154(b) by 0 days.

(21) Appl. No.: 18/829,057

(22) Filed: Sep. 9, 2024

(65) Prior Publication Data
US 2025/0026800 A1    Jan. 23, 2025

Related U.S. Application Data

(63) Continuation of application No. 18/172,938, filed on Feb. 22, 2023, now abandoned.

(60) Provisional application No. 63/312,697, filed on Feb. 22, 2022.

(51) Int. Cl.
| | |
|---|---|
| *C07K 14/54* | (2006.01) |
| *A61K 35/17* | (2015.01) |
| *A61K 38/00* | (2006.01) |
| *A61K 39/395* | (2006.01) |
| *A61P 35/00* | (2006.01) |
| *C07K 14/55* | (2006.01) |
| *C07K 16/28* | (2006.01) |
| *C07K 16/32* | (2006.01) |
| *C07K 16/46* | (2006.01) |

(52) U.S. Cl.
CPC .......... *C07K 14/5428* (2013.01); *A61K 35/17* (2013.01); *A61P 35/00* (2018.01); *C07K 14/5406* (2013.01)

(58) Field of Classification Search
None
See application file for complete search history.

(56) References Cited

U.S. PATENT DOCUMENTS

| | | | |
|---|---|---|---|
| 4,690,915 A | 9/1987 | Rosenberg | |
| 10,858,412 B2 | 12/2020 | Mumm | |
| 11,292,822 B2 | 4/2022 | Mumm | |
| 11,572,397 B2 * | 2/2023 | Mumm | ............... C07K 16/2803 |
| 12,116,389 B2 * | 10/2024 | Mumm | .................. C07K 14/55 |
| 2019/0099487 A1 | 4/2019 | Mumm et al. | |
| 2023/0210953 A1 * | 7/2023 | Mumm | ............ A61K 39/39558 424/85.2 |

FOREIGN PATENT DOCUMENTS

| | | |
|---|---|---|
| WO | 2021/207828 A1 | 10/2021 |
| WO | 2022/240360 A1 | 11/2022 |

OTHER PUBLICATIONS

International Search Report and Written Opinion received for PCT Patent Application No. PCT/US2023/063062, mailed on Jul. 31, 2023, 10 pages.
UniProtKB Accession No. Q6FGW4, Interleukin family protein, May 10, 2005 [online]. <URL: https://www.uniprotkb/Q6FGW4/entry>.
Hosseini, I. (2020). Mitigating the risk of cytokine release syndrome in Phase I trial of CD20CD3 bispecific antibody mosunetuzumab in NHL impact of translational system modeling. Systems Biology and Applications.
Maude, S. L. (2014). Managing Cytokine Release Syndrome Associated with Novel T Cell-Engaging Therapies. Cancer Journal.

* cited by examiner

*Primary Examiner* — Ilia I Ouspenski
(74) *Attorney, Agent, or Firm* — ArentFox Schiff LLP

(57) ABSTRACT

The disclosure provides for various methods including a method of reducing the severity of bispecific T cell engager (BiTE) or chimeric antigen receptor T cell (CAR-T) induced cytokine release syndrome (CRS) comprising administering to a patient in need thereof an amount of a composition comprising an interleukin 10 (IL-10) or an IL-10 agent, an interleukin 4 (IL-4) or an IL-4 agent, or combinations thereof.

5 Claims, 12 Drawing Sheets

Specification includes a Sequence Listing.

APC's without DK2[10] (EGFR)

APC's with DiaKine™

METHOD OF REDUCING BISPECIFIC T CELL ENGAGER OR CHIMERIC ANTIGEN RECEPTOR T CELL MEDIATED CYTOKINE RELEASE SYNDROME USING INTERLEUKINS-4, -10, OR A FUSION PROTEIN THEREOF

CROSS REFERENCE TO RELATED APPLICATIONS

This application is a Continuation of U.S. application Ser. No. 18/172,938 filed Feb. 23, 2023, which claims priority to U.S. Provisional Application No. 63/312,697, filed Feb. 22, 2022, the disclosures of which are incorporated by reference in their entirety.

REFERENCE TO AN ELECTRONIC SEQUENCE LISTING

The contents of the electronic sequence listing (039451-00100-Sequence-Listing.xml; Size: 37,997 bytes; and Date of Creation: Feb. 22, 2023) are herein incorporated by reference in its entirety.

BACKGROUND

Cytokine Release Syndrome (CRS) is a dose and treatment related toxicity resulting from Bispecific T cell Engager (BiTE) (Hosseini, 2020) activation of T cells and application of Chimeric Antigen Receptor T cells (CAR-T) to patients (Maude, 2014; Norelli, 2018). CRS is defined by the uncontrolled induction of high levels of interleukin 6 (IL-6) and interleukin 1 beta (IL-1β) predominantly (Liu, 2018), Tumor Necrosis Factor alpha (TNFα) (Chen, 2021) and interferon gamma (IFNγ) (Shimabukuro-Vornhagen, 2018) in the serum of treated patients.

To date, the molecular circuit responsible for the induction of CRS is not known. Based on the inventor's findings, it has been determined that the induction of CRS in BiTE and CAR-T patients is likely due to T Cell receptor (TCR): BiTE or CAR-T:Tumor Associated Antigen (TAA) clustering mediated activation of CD4+ T cells. This activation, in-turn, leads to the secretion of IL-2 (Brandl, 2007). The secretion of IL-2 then drives monocyte secretion of the proinflammatory cytokines associated with CRS (Bosco, 2000; Musso, 1992; Strieter, 1989).

SUMMARY OF VARIOUS EMBODIMENTS

The inventor has found that treating monocytes with IL-10 or IL-4, IL-12, IL-15, IL-7 or any combination of the foregoing, or any half-life extended version thereof or any diakine comprising IL-10, IL-4, 11-12, IL-15, IL-7, or IL-2 that will engage cognate cytokine receptors on monocytes and directly inhibits the induction of proinflammatory cytokines by IL-2.

In one aspect, the application relates to a method of treating a monocyte with either IL-10 or IL-4, IL-12, IL-15, IL-7, half-life extended versions thereof, a combination of IL-10 and IL-4, IL-10 and IL-2, IL-10 and IL-7, IL-10 and IL-12, IL-10 and IL-15, or a fusion protein or diakine comprising at least two cytokines, wherein at least one of the at least two cytokines is IL-10 or IL-4, IL-12, 11-15, or IL-7 to reduce CRS associated with BiTE or CAR-T therapies. In one embodiment, monocytes are treated with IL-10, or IL-4, IL-12, IL-15, IL-7 or a half-life extended version thereof or a diakine comprising at least one of at least two cytokines is IL-10 or IL-4, IL-12, IL-15, or IL-7. In another embodiment a patient will be treated with IL-10 or a half-life extended version thereof and a BiTE or CAR-T. In yet another embodiment, a patient will be treated with IL-4 or a half-life extended version thereof and a BiTE or CAR-T. In another embodiment, a patient is treated with a diakine comprising IL-10 and any one of IFN-α, IL-2, IL-4, IL-7, IL-12, IL-15, IL-21 or IL-27 in an amount sufficient to reduce CRS. In yet another embodiment a patient is treated with a diakine comprising IL-4 and any one of IFN-α, IL-2, IL-7, IL-10, IL-12, IL-15, IL-21, or IL-27 in an amount sufficient to reduce CRS.

In another aspect, the application relates to a method of reducing BiTE or CAR-T associated CRS comprising administering to a subject thereof a BiTE or CAR-T therapeutic modality in combination with IL-10, IL-4, or any combination thereof, or a diakine comprising at least one of IL-10, IL-4, IL-2. In one embodiment, the method comprises administering to a patient in need thereof the BiTE or CAR-T therapy before, after or simultaneously with the IL-10 or IL-4, IL-12, IL-15, or IL-7, or half-life extended versions thereof, or a diakine comprising IL-10 or IL-4 combined with IFN-α, IL-2, IL-7, IL-12, IL-15, IL-21 or IL-27.

In yet another aspect, the application relates to a method of inhibiting the induction of proinflammatory cytokines in a patient undergoing BiTE or CAR-T therapy comprising administering to the patient undergoing said therapy a dose of IL-10 or IL-4 or half-life extended versions thereof, or a diakine comprising IL-10 or IL-4 in combination with IFN-α, IL-2, IL-7, IL-12, IL-15, IL-21 or IL-27 in an amount sufficient to suppress CRS caused by the proinflammatory cytokines.

The above simplified summary of representative aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

DETAILED DESCRIPTION

Figure 1:
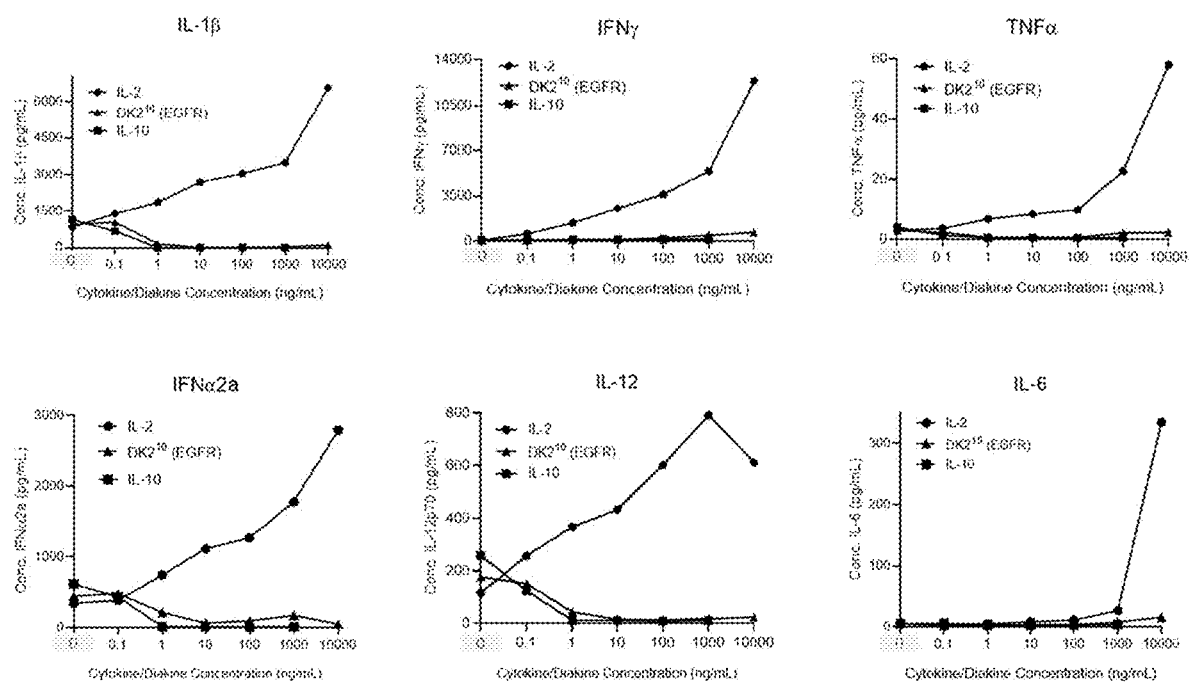
FIG. 1 are graphs measuring the level of IL1β, IFNγ, TNFα, IFNα2a, IL-12, and IL-6 in PBMC in response to increasing levels of IL-2 exposure.

Exemplary aspects are described herein in the context of a using IL-10, IL-4, IL-12, IL-15, IL-7, or half-life extended versions thereof, or a diakine comprising at least one of IL-10 or IL-4 in combination with IFN-α, IL-2, IL-7, IL-12, IL-15, or IL-27 in a method of suppressing, inhibiting, reducing or preventing CRS associated with BiTE or CAR-T therapeutic modalities. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying drawings. The same reference indicators will be used to the extent possible throughout the drawings and the following description to refer to the same or like items.

Although a number of methods and materials similar or equivalent to those described herein can be used in the practice of the various described embodiments, the preferred materials and methods are described herein.

Unless otherwise indicated, the embodiments described herein employ conventional methods and techniques of molecular biology, biochemistry, pharmacology, chemistry, and immunology, which are well known to a person skilled in the art. See, e.g., Sambrook, et al., Molecular Cloning: A Laboratory Manual (2nd Edition, 1989); Methods In Enzymology (S. Colowick and N. Kaplan eds., Academic Press, Inc.); Handbook of Experimental Immunology, Vols. I-IV (D. M. Weir and C. C. Blackwell eds., Blackwell Scientific Publications); A. L. Lehninger, Biochemistry (Worth Publishers, Inc., current addition). Many of the general techniques for designing and fabricating diakines have been previously described in U.S. Application Publication No. 20220017587. This includes the types of IL-10 variants, including but not limited to human, mouse, CMV and/or EBV forms of IL-10, as well as the assays for testing the IL-10 variants, diakines, and other are known assay methods.

The following terms will be used to describe the various embodiments discussed herein, and are intended to be defined as indicated below.

As used herein in describing the various embodiments, the singular forms "a", "an" and "the" include plural referents unless the content clearly dictates otherwise.

The term "about", refers to a deviance of between 0.0001-5% from the indicated number or range of numbers. In one embodiment, the term "about", refers to a deviance of between 1-10% from the indicated number or range of numbers. In one embodiment, the term "about", refers to a deviance of up to 25% from the indicated number or range of numbers. In a more specific embodiment, the term "about" refers to a difference of 1-25% in terms of nucleotide sequence homology or amino acid sequence homology when compared to a wild-type sequence.

The term "agent" as it relates to the various interleukins (IL), such "IL-10 agent" or "IL-4 agent" and the like, are intended to be construed broadly and include, for example, human and non-human forms of the interleukin polypeptides, including homologs, variants (including muteins), fragments thereof, and fusion proteins, as well as polypeptides having, for example, a leader sequence (e.g., the signal peptide), and modified versions of the foregoing. The present disclosure also contemplates nucleic acid molecules encoding the foregoing, vectors and the like containing the nucleic acid molecules, and cells (e.g., transformed cells and host cells) that express the interleukin agents. The terms "variant," "analog" and "mutein" refer to biologically active derivatives of the reference molecule, that retain a desired activity, such as, for example, anti-inflammatory activity. Generally, the terms "variant," "variants," "analog" and "mutein" as it relates to a polypeptide refers to a compound or compounds having a native polypeptide sequence and structure with one or more amino acid additions, substitutions (which may be conservative in nature), and/or deletions, relative to the native molecule. For example, the terms "IL-10 variant", "variant IL-10," "IL-10 variant molecule," and grammatical variations and plural forms thereof are all intended to be equivalent terms that refer to a variant forms of IL-10 amino acid (or nucleic acid) sequence that differs from wild-type IL-10 form anywhere from 1-25% in sequence identity or homology. Thus, for example, an EBV IL-10 variant molecule is one that differs from wild-type EBV IL-10 by having one or more amino acid (or nucleotide sequence encoding the amino acid) additions, substitutions and/or deletions.

The term "fusion protein" refers to a combination or conjugation of two or more proteins or polypeptides that results in a novel arrangement of proteins that do not normally exist naturally. The fusion protein is a result of covalent linkages of the two or more proteins or polypeptides. The two or more proteins that make up the fusion protein may be arranged in any configuration from amino-terminal end ("NH$_2$") to carboxy-terminal end ("COOH").

The term "homolog," "homology," "homologous" or "substantially homologous" refers to the percent identity between at least two polynucleotide sequences or at least two polypeptide sequences. Sequences are homologous to each other when the sequences exhibit at least about 50%, preferably at least about 75%, more preferably at least about 80%-85%, preferably at least about 90%, and most preferably at least about 95%-98% sequence identity over a defined length of the molecules.

The term "sequence identity" refers to an exact nucleotide-by-nucleotide or amino acid-by-amino acid correspondence. The sequence identity may range from 100% sequence identity to 50% sequence identity. A percent sequence identity can be determined using a variety of methods including but not limited to a direct comparison of the sequence information between two molecules (the reference sequence and a sequence with unknown percent identity to the reference sequence) by aligning the sequences, counting the exact number of matches between the two aligned sequences, dividing by the length of the reference sequence, and multiplying the result by 100. Readily available computer programs can be used to aid in the identification of percent identity.

The terms "subject," "individual" or "patient" are used interchangeably herein and refer to a vertebrate, preferably a mammal. Mammals include, but are not limited to, murine, rodent, simian, human, farm animals, sport animals, and certain pets.

The term "administering" includes routes of administration which allow the active ingredient of the application to perform their intended function.

A "therapeutically effective amount" or "effective amount" as it relates to, for example, administering the IL variants, fusion proteins, dual cytokine fusion proteins, or diakine thereof described herein, refers to an amount sufficient to promote certain biological activities. These might include, for example, suppression of myeloid cell function, enhanced Kupffer cell activity, and/or lack of any effect on $CD8^+$ T cells or enhanced $CD8^+$ T-cell activity as well as blockade of mast cell upregulation of Fc receptor or prevention of degranulation or to promote or enhance to effects of combination therapeutics (e.g., CAR-T therapies) or to suppress the induction of cytokines from monocytes or macorphages. Thus, an "effective amount" will ameliorate or prevent a symptom or sign of the medical condition. Effective amount also means an amount sufficient to allow or facilitate diagnosis.

The term "treat," "treating," or "treatment" refers to a method of reducing the effects of a disease or condition. Treatment can also refer to a method of reducing the underlying cause of the disease or condition itself rather than just the symptoms. The treatment can be any reduction from native levels and can be, but is not limited to, the complete ablation of the disease, condition, or the symptoms of the disease or condition.

The term "half-life extended" as used in this application, refers to a protein that includes one of more additional moiety or moieties (such as proteins or PEGylation) that extends and/or enhances the circulation time within a subject anywhere in the range of 1-100 fold longer than a protein in the absence of the additional moiety or moieties. As it relates to IL, in one preferred embodiment, a half-life extended IL refers to an IL-10 or IL-4, IL-7, IL-12, or IL-15 conjugated to a scFv whereby the circulation time is extended in the range of 1-10 fold longer than the IL in the absence of the scFv. In another embodiment, a half-life extended version of an IL will adopt the configuration of formula I $$NH_2\text{-}(Y)\text{-}(X^1)\text{-}(X^2)\text{-}(Y)\text{-}COOH,$$

wherein
"Y" is any monomer from either a homodimeric or heterodimeric cytokine;
"X" is a VL or VH region obtained from a first monoclonal antibody;
"$X^2$" is a VH or VL region obtained from the first monoclonal antibody,
wherein when $X^1$ is a VL, $X^2$ is a VH or when $X^1$ is a VH, $X^2$ is a VL and wherein the VH and VL together form a scFv.

The term "diakine" or "DK", as used in this application, refers to a dual cytokine fusion protein comprising two monomers of a dimeric cytokine, which can be either a homodimer such as IL-10 or IL-10 variants, or a heterodimer such as IL-12 or IL-12 variants, that is fused together with a monomeric cytokine, such as IL-2, IL-4, IL-7, IL-15, IL-21, IL-28, IL-29, or with a dimeric cytokine, such as IL-12 or IL-10, whereby both of the dimeric cytokine and monomeric cytokine being fused onto a half-life extending antigen targeting domain. Representative diakines are described in detail in U.S. Pat. No. 11,292,822 (IL-10 based diakines) and co-pending U.S. application Ser. No. 18/065,504 (dual dimeric cytokine based diakines), both of which are incorporated by reference in their entireties. In one embodiment, a diakine, which may be used in a method in combination with a BiTE or CAR-T, is represented by formula II $$NH_2\text{-}(Y)\text{-}(X^1)\text{-}(Zn)\text{-}(X^2)\text{-}(Y)\text{-}COOH \quad \text{(Formula II)}$$

wherein
"Y" is any monomer from either a homodimeric or heterodimeric cytokine;
"X" is a VL or VH region obtained from a first monoclonal antibody;
"$X^2$" is a VH or VL region obtained from the first monoclonal antibody,
wherein when X' is a VL, $X^2$ is a VH or when X' is a VH, $X^2$ is a VL and wherein the VH and VL together form a scFv;
"Z" is a second cytokine, wherein the second cytokine is any monomeric cytokine or another dimeric cytokine; and
"n" is an integer selected from 0-2.

In one embodiment, dimeric cytokine may include IFN-α, IL-2, IL-4, IL-7, IL-10, IL-12, IL-15, IL-21, and IL-27. In another embodiments, the monomeric cytokine may include IL-6, IL-4, IL-1, IL-2, IL-3, IL-5, IL-7, IL-8, IL-9, IL-15, IL-21 IL-26, IL-27, IL-28, IL-29, GM-CSF, G-CSF, interferons-α, -β, -γ, TGF-β, or tumor necrosis factors-α, -β, basic FGF, EGF, PDGF, IL-4, IL-11, or IL-13. The VH and VL of the diakine is a scFv and may be derived from any monoclonal antibody but is preferably derived from an antibody that is capable of targeting a specific antigen. The monoclonal antibody from which the scFv (as it applies to Formula I and II) may be derived is selected from EGFR; CD52; CD14; various immune check point targets, such as but not limited to PD-L1, PD-1, TIM3, BTLA, LAG3 or CTLA4; CD19; CD20; CD22; CD47; GD-2; VEGFR1; VEGFR2; HER2; PDGFR; EpCAM; ICAM (ICAM-1, -2, -3, -4, -5), VCAM, CD14, FAPα; 5T4; Trop2; EDB-FN; TGFβ Trap; MAdCAM, β7 integrin subunit; α4β7 integrin; α4 integrin SR-A1; SR-A3; SR-A4; SR-A5; SR-A6; SR-B; dSR-C1; SR-D1; SR-E1; SR-F1; SR-F2; SR-G; SR-H1; SR-H2; SR-I1; SR-J1; CD123; CD33; BCMA; PSA; PSMA; CEA; GPC3; BCMA; DLL3; MUC17; CLDN 18; gpA33; HIV or Ebola. In an embodiment, the scFv (as it applies to Formula I and II) is an engrafted scFv, whereby the VH and VL framework region is derived from a first antibody (such as an anti-ebola antibody) and the CDRs are obtained from a second antibody (such as but not limited to EGFR; CD52; CD14; various immune check point targets, such as but not limited to PD-1, PD-1, TIM3, BTLA, LAG3 or CTLA4; CD19; CD20; CD22; CD47; GD-2; VEGFR1; VEGFR2; HER2; PDGFR; EpCAM; ICAM (ICAM-1, -2, -3, -4, -5), VCAM, CD14, FAPα; 5T4; Trop2; EDB-FN; TGFβ Trap; MAdCAM, P7 integrin subunit; α4β7 integrin; α4 integrin SR-A1; SR-A3; SR-A4; SR-A5; SR-A6; SR-B; dSR-C1; SR-D1; SR-E1; SR-F1; SR-F2; SR-G; SR-H1; SR-H2; SR-I1; SR-J1; CD123; CD33; BCMA; PSA; PSMA; CEA; GPC3; BCMA; DLL3; MUC17; CLDN 18; gpA33; HIV or Ebola). In one preferred embodiment, the scFv is derived from an anti-Ebola antibody where the VH and VL framework regions of an anti-ebola antibody are substituted or engrafted with 6 CDR regions from an antibody specific for EGFR; CD52; CD14; various immune check point targets, such as but not limited to PD-L1, PD-1, TIM3, BTLA, LAG3 or CTLA4; CD19; CD20; CD22; CD47; GD-2; VEGFR1; VEGFR2; HER2; PDGFR; EpCAM; ICAM (ICAM-1, -2, -3, -4, -5), VCAM, CD14, FAPα; 5T4; Trop2; EDB-FN; TGFβ Trap; MAdCAM, β7 integrin subunit; α4β7 integrin; α4 integrin SR-A1; SR-A3; SR-A4; SR-A5; SR-A6; SR-B; dSR-C1; SR-D1; SR-E1; SR-F1; SR-F2; SR-G; SR-H1; SR-H2; SR-I1; SR-J1; CD123; CD33; BCMA; PSA; PSMA; CEA; GPC3; BCMA; DLL3; MUC17; CLDN 18; gpA33; more preferably an anti-EGFR, anti-MAdCAM, anti-VEGFR1, anti-VEGFR2, anti-PDGFR, or anti-CD14, anti-CD19, anti-CD20, or anti-CD22.

In another embodiment, the diakine, which may be used in a method in combination with a BiTE or a CAR-T, is a diakine described in U.S. Pat. No. 11,292,822 (IL-10 based diakines) or co-pending U.S. application Ser. No. 18/065,504 (dual dimeric cytokine based diakines), both of which are incorporated by reference in their entireties. In yet another embodiment, the diakine, which may be used in a method in combination with a BiTE or a CAR-T, is protein represented by formula III $$NH_2\text{-}(IL\text{-}10)\text{-}(X^1)\text{-}(Zn)\text{-}(X^2)\text{-}(IL\text{-}10)\text{-}COOH \quad \text{(Formula III)};$$

wherein
"IL-10" is a monomer;
"X¹" is a VL or VH region from a first monoclonal antibody;
"X²" is a VH or VL region from the first monoclonal antibody;
wherein when X¹ is a VL, X² is a VH or when X¹ is a VH, X² is a VL;
wherein the first monoclonal antibody is an anti-ebola antibody or the scFv framework region obtained therefrom;
wherein the VL and VH from the anti-ebola antibody include 3 light chain CDRs and 3 heavy chain CDRs that are engrafted with 3 light chain CDRs and 3 heavy chain CDRs from a second monoclonal antibody;
"Z" is a cytokine other than IL-10;

"n" is an integer of 1; and wherein the following variables in Table 1 apply to formula III:

TABLE 1

| "IL-10" monomer | "second monoclonal antibody" | "Z" |
|---|---|---|
| Human IL-10 (Seq ID No: 1) | EGFR | 2<br>15<br>7<br>28<br>29<br>IFN-alpha<br>21 |
| | HER2 | 2<br>15<br>7<br>28<br>29<br>IFN-alpha<br>21 |
| | VEGFR2 | 2<br>15<br>7<br>28<br>29<br>IFN-alpha<br>21 |
| | PDGFR | 2<br>15<br>7<br>28<br>29<br>IFN-alpha<br>21 |
| | GPC3 | 2<br>15<br>7<br>28<br>29<br>IFN-alpha<br>21 |

TABLE 1-continued

| "IL-10" monomer | "second monoclonal antibody" | "Z" |
|---|---|---|
| | PD-L1 | 2<br>15<br>7<br>28<br>29<br>IFN-alpha<br>21 |
| | CD19 | 2<br>15<br>7<br>28<br>29<br>IFN-alpha<br>21 |
| | CD20 | 2<br>15<br>7<br>28<br>29<br>IFN-alpha<br>21 |
| | CD22 | 2<br>15<br>7<br>28<br>29<br>IFN-alpha<br>21 |
| | PSMA | 2<br>15<br>7<br>28<br>29<br>IFN-alpha<br>21 |
| | CEA | 2<br>15<br>7<br>28<br>29<br>IFN-alpha<br>21 |
| | BCMA | 2<br>15<br>7<br>28<br>29<br>IFN-alpha<br>21 |
| | gpA33 | 2<br>15<br>7<br>28<br>29<br>IFN-alpha<br>21 |
| | CD33 | 2<br>15<br>7<br>28<br>29<br>IFN-alpha<br>21 |
| | DLL3 | 2<br>15<br>7<br>28<br>29<br>IFN-alpha<br>21 |
| | MUC17 | 2<br>15<br>7<br>28<br>29<br>IFN-alpha<br>21 |

TABLE 1-continued

| "IL-10" monomer | "second monoclonal antibody" | "Z" |
|---|---|---|
| | CLDN18 | 2 |
| | | 15 |
| | | 7 |
| | | 28 |
| | | 29 |
| | | IFN-alpha |
| | | 21 |
| | GD2 | 2 |
| | | 15 |
| | | 7 |
| | | 28 |
| | | 29 |
| | | IFN-alpha |
| | | 21 |
| | 5T4 | 2 |
| | | 15 |
| | | 7 |
| | | 28 |
| | | 29 |
| | | IFN-alpha |
| | | 21 |
| | HER3 | 2 |
| | | 15 |
| | | 7 |
| | | 28 |
| | | 29 |
| | | IFN-alpha |
| | | 21 |
| EBV IL-10 (Seq ID No: 5) | EGFR | 2 |
| | | 15 |
| | | 7 |
| | | 28 |
| | | 29 |
| | | IFN-alpha |
| | | 21 |
| | HER2 | 2 |
| | | 15 |
| | | 7 |
| | | 28 |
| | | 29 |
| | | IFN-alpha |
| | | 21 |
| | VEGFR2 | 2 |
| | | 15 |
| | | 7 |
| | | 28 |
| | | 29 |
| | | IFN-alpha |
| | | 21 |
| | PDGFR | 2 |
| | | 15 |
| | | 7 |
| | | 28 |
| | | 29 |
| | | IFN-alpha |
| | | 21 |
| | GPC3 | 2 |
| | | 15 |
| | | 7 |
| | | 28 |
| | | 29 |
| | | IFN-alpha |
| | | 21 |
| | PD-L1 | 2 |
| | | 15 |
| | | 7 |
| | | 28 |
| | | 29 |
| | | IFN-alpha |
| | | 21 |
| | CD19 | 2 |
| | | 15 |
| | | 7 |
| | | 28 |
| | | 29 |
| | | IFN-alpha |
| | | 21 |

TABLE 1-continued

| "IL-10" monomer | "second monoclonal antibody" | "Z" |
|---|---|---|
| | CD20 | 2 |
| | | 15 |
| | | 7 |
| | | 28 |
| | | 29 |
| | | IFN-alpha |
| | | 21 |
| | CD22 | 2 |
| | | 15 |
| | | 7 |
| | | 28 |
| | | 29 |
| | | IFN-alpha |
| | | 21 |
| | PSMA | 2 |
| | | 15 |
| | | 7 |
| | | 28 |
| | | 29 |
| | | IFN-alpha |
| | | 21 |
| | CEA | 2 |
| | | 15 |
| | | 7 |
| | | 28 |
| | | 29 |
| | | IFN-alpha |
| | | 21 |
| | BCMA | 2 |
| | | 15 |
| | | 7 |
| | | 28 |
| | | 29 |
| | | IFN-alpha |
| | | 21 |
| | gpA33 | 2 |
| | | 15 |
| | | 7 |
| | | 28 |
| | | 29 |
| | | IFN-alpha |
| | | 21 |
| | CD33 | 2 |
| | | 15 |
| | | 7 |
| | | 28 |
| | | 29 |
| | | IFN-alpha |
| | | 21 |
| | DLL3 | 2 |
| | | 15 |
| | | 7 |
| | | 28 |
| | | 29 |
| | | IFN-alpha |
| | | 21 |
| | MUC17 | 2 |
| | | 15 |
| | | 7 |
| | | 28 |
| | | 29 |
| | | IFN-alpha |
| | | 21 |
| | CLDN18 | 2 |
| | | 15 |
| | | 7 |
| | | 28 |
| | | 29 |
| | | IFN-alpha |
| | | 21 |
| | GD2 | 2 |
| | | 15 |
| | | 7 |
| | | 28 |
| | | 29 |
| | | IFN-alpha |
| | | 21 |

TABLE 1-continued

| "IL-10" monomer | "second monoclonal antibody" | "Z" |
|---|---|---|
| | 5T4 | 2 |
| | | 15 |
| | | 7 |
| | | 28 |
| | | 29 |
| | | IFN-alpha 21 |
| | HER3 | 2 |
| | | 15 |
| | | 7 |
| | | 28 |
| | | 29 |
| | | IFN-alpha 21 |

In another embodiment, the diakine, which may be used in a method in combination with a BiTE or CAR-T, is a diakine described in co-pending U.S. application Ser. No. 18/065,504 in Tables 2a-2d and 3a-3d, which is incorporated by reference in its entirety.

In another aspect, the protein or nucleic acid molecules encoding dual cytokine fusion protein or DK may be formulated as a pharmaceutical composition comprising a therapeutically effective amount of the dual cytokine fusion protein and a pharmaceutical carrier and/or pharmaceutically acceptable excipients. The pharmaceutical composition may be formulated with commonly used buffers, excipients, preservatives, stabilizers. The pharmaceutical compositions comprising the dual cytokine fusion protein is mixed with a pharmaceutically acceptable carrier or excipient. Various pharmaceutical carriers are known in the art and may be used in the pharmaceutical composition. For example, the carrier can be any compatible, non-toxic substance suitable for delivering the dual cytokine fusion protein compositions of the application to a patient. Examples of suitable carriers include normal saline, Ringer's solution, dextrose solution, and Hank's solution. Carriers may also include any poloxamers generally known to those of skill in the art, including, but not limited to, those having molecular weights of 2900 (L64), 3400 (P65), 4200 (P84), 4600 (P85), 11,400 (F88), 4950 (P103), 5900 (P104), 6500 (P105), 14,600 (F108), 5750 (P123), and 12,600 (F127). Carriers may also include emulsifiers, including, but not limited to, polysorbate 20, polysorbate 40, polysorbate 60, and polysorbate 80, to name a few. Non-aqueous carriers such as fixed oils and ethyl oleate may also be used. The carrier may also include additives such as substances that enhance isotonicity and chemical stability, e.g., buffers and preservatives, see, e.g., Remington's Pharmaceutical Sciences and U.S. Pharmacopeia: National Formulary, Mack Publishing Company, Easton, Pa. (1984). Formulations of therapeutic and diagnostic agents may be prepared by mixing with physiologically acceptable carriers, excipients, or stabilizers in the form of lyophilized powders, slurries, aqueous solutions or suspensions, for example.

The pharmaceutical composition will be formulated for administration to a patient in a therapeutically effective amount sufficient to provide the desired therapeutic result. Preferably, such amount has minimal negative side effects. In one embodiment, the amount of dual cytokine fusion protein administered will be sufficient to treat or prevent inflammatory diseases or condition. In another embodiment, the amount of dual cytokine fusion protein administered will be sufficient to treat or prevent immune diseases or disorders. In still another embodiment, the amount of diakine or dual cytokine fusion protein administered will be sufficient to treat or prevent CRS mediated by BiTE or CAR-T therapy. The amount administered may vary from patient to patient and will need to be determined by considering the subject's or patient's disease or condition, the overall health of the patient, method of administration, the severity of side-effects, and the like.

An effective amount for a particular patient may vary depending on factors such as the condition being treated, the overall health of the patient, the method route and dose of administration and the severity of side effects. The appropriate dose administered to a patient is typically determined by a clinician using parameters or factors known or suspected in the art to affect treatment or predicted to affect treatment. Generally, the dose begins with an amount somewhat less than the optimum dose and it is increased by small increments thereafter until the desired or optimum effect is achieved relative to any negative side effects. Important diagnostic measures include those of symptoms of, e.g., the inflammation or level of inflammatory cytokines produced.

The method for determining the dosing of the presently described dual cytokine fusion protein will be substantially similar to that described in U.S. Pat. No. 10,858,412. Generally, the presently described dual cytokine fusion protein will have a dosing in the range of 0.01 mg/kg to 1 mg/kg, preferably 0.025 mg/kg to 0.5 mg/kg. The dual cytokine fusion protein may be administered daily, three times a week, twice a week, weekly, bimonthly, or monthly. An effective amount of therapeutic will impact the level of CRS inhibited caused by the BiTE or CAR-T therapy. In yet another embodiment, the diakine will be dosed at a concentration of 0.1 ng/mL to 200 ng/mL, preferably, 10 ng/mL to 100 ng/mL. Generally, the addition of a diakine will lower the required dose for a BiTE or CAR-T modality.

Compositions of the application can be administered orally or injected into the body. Formulations for oral use can also include compounds to further protect the IL or DK molecules from proteases in the gastrointestinal tract. Injections are usually intramuscular, subcutaneous, intradermal or intravenous. Alternatively, intra-articular injection or other routes could be used in appropriate circumstances. Parenterally administered dual cytokine fusion protein are preferably formulated in a unit dosage injectable form (solution, suspension, emulsion) in association with a pharmaceutical carrier and/or pharmaceutically acceptable excipients. In other embodiments, compositions of the application may be introduced into a patient's body by implantable or injectable drug delivery system.

Those of skill in the art will recognize that adoptive cell therapy (such as adoptive T-cell therapy) is well known and practiced according to procedures previously described. See, e.g., U.S. Pat. No. 4,690,915. These methods may include autologous transfer (i.e., derived from the patient) or allogenic transfer (i.e. derived from another subject other than the patient to be treated).

The CAR-T or TCR-T cells are administered by methods known and conventionally practiced by those familiar with adaptive cell therapy. In one embodiment, the administration method includes, but is not limited to bolus infusion, intravenous or subcutaneous injections, intraocular injection, periocular injection, subretinal injection, intravitreal injection, trans-septal injection, subscleral injection, intrachoroidal injection, intracameral injection, subconjectval injection, subconjuntival injection, sub-Tenon's injection, retrobulbar injection, peribulbar injection, or posterior juxtascleral delivery. In some embodiments, they are administered by parenteral, intrapulmonary, and intranasal, or intralesional or intrtumoral administration. Parenteral infusions include intramuscular, intravenous, intraarterial, intraperitoneal, or subcutaneous administration. In certain some embodiments, the recombinantly engineered CAR-T or TCR-T is administered as a single bolus administration, multiple bolus or continuous infusion. Generally known CAR-T therapies include idecabtagene vicleucel, lisocabtagene maraleucel, brexucabtagene autoleucel, tisagenlecleucel, or axicabtagene ciloleucel.

In one embodiment, the diakine and the CAR-T are administered in separate subsequent time periods, wherein, for example, the diakine (such as $DK2^{10}$vegfr2 or $DK2^{10}$EGFR or any of those referenced in Table 1, above) is administered prior to the administration of a recombinantly engineered CAR-T cell.

In other embodiments, the diakine and the CAR-T are administered simultaneously. In other embodiments, the diakine is administered 1-3 days before the CAR-T therapy and then simultaneously administered along with the CAR-T, and/or 1-7 days following CAR-T administration. The diakine may be administered once a day or week, or 2-3 times a week in combination or conjunction with the CAR-T. In another aspect, the diakine is utilized in the expansion and/or thawing procedure of the CAR-T cells prior to administration. Upon reconstituting CAR-T cells from cryopreserved stock, the CAR-T are typically rested in the presence of CAR-T beneficial cytokines (e.g., low dose IL-2). In one aspect, the CAR-T cells may be primed or expanded from cryopreserved stocks in the presence of a diakine. In one aspect, the CAR-T is expanded or primed in the presence of 0.001 to 300 ng/mL of a diakine, more preferably 0.01 to 200 ng/mL of a diakine.

Likewise, the diakine and the BiTE are administered in separate subsequent time periods, wherein the diakine (e.g., $DK2^{10}$CD20 or $DK2^{10}$EGFR or $DK2^{10}$HER2 or $DK2^{10}$HER3) is administered 1-3 days before administering the BiTE (e.g., CD3×CD19 BiTE). In other embodiments, the diakine is administered 1-3 days before the BiTE and then simultaneously administered along with the BiTE, and/or 1-7 days following BiTE administration. The diakine may be administered once a day or week, or 2-3 times a week in combination or conjunction with the BiTE. A BiTE will generally follow the format of a bispecific antibody having an anti-CD3 and an anti-TAA fused together. In one embodiment, method combines an IL-10 or IL-4, or half-life extended versions thereof, or a diakine comprising IL-10 or IL-4 and IFN-α, IL-2, IL-7, IL-12, IL-15, IL-21 or IL-27, in conjunction with a BiTE, such as those that have bispecificity for CD3 with CD33, BCMA, CD19, CD20, CD22, PSMA, EGFR, DLL3, MUC17, CLDN18, CEA, HER2, HER3, EpCAM, gpA33, GPC3, GD2 5T4, VEGFR2, PDGFR, PDL1, or PD1 to name a few. In a preferred embodiment, the BiTE is an anti-CD3 and anti-CD19, anti-CD20, anti-HER2, anti-HER3, anti-PSMA, or anti-BCMA.

It is generally understood that CRS is associated by concomitant increases in serum IL-6, IL-1β, TNFα, IFNα/γ, IL-12 and IL-23. While these cytokines are generally associated with CRS, it is not known whether one, two or all of these cytokines working together to lead to the toxic side effects associated with CRS. The inventor believes that a potential root cause of CRS is the fact than many patients with severe CRS induced by BiTE or CAR-T treatment develop vascular leak syndrome. Vascular or capillary leak syndrome is also predominantly observed as the dose limiting and often lethal toxicity associated with high dose IL-2 therapy. In addition, the inventor has found that that treatment of human peripheral blood mononuclear cells (PBMC) or human whole blood cells with an increasing concentration of IL-2 leads to the induction of a panel of proinflammatory cytokines reminiscent of CRS. FIG. 1.

Figure 2:
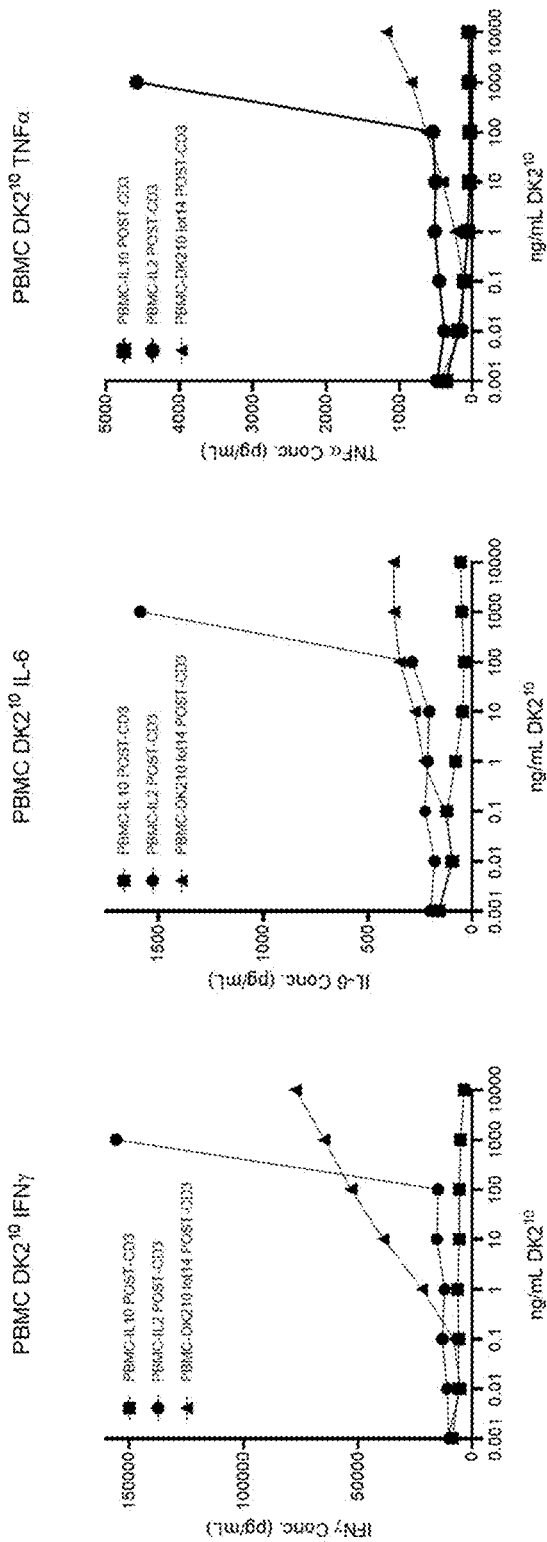
FIG. 2 are graphs measuring the levels of IFNγ, IL-6, and TNFα induction from PBMC to response to 1 ug/mL of anti-CD3 in the presence of a diakine, IL-10 and IL-2.
Figure 3:
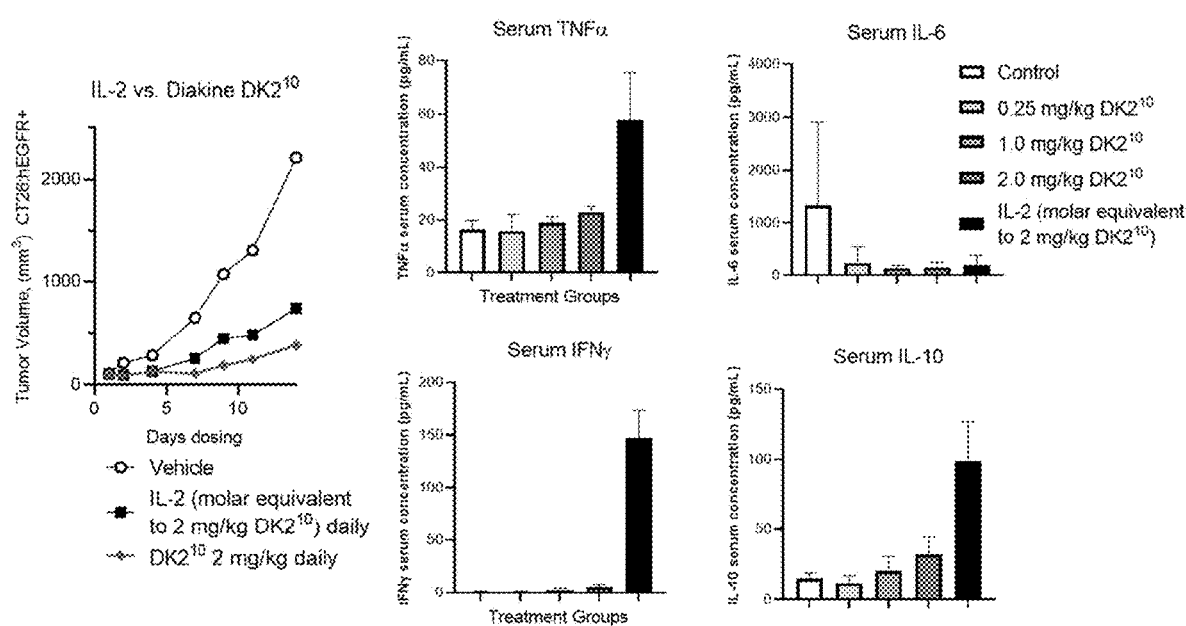
FIG. 3 mouse serum cytokines obtained from diakine exposure in vivo.
Figure 4:
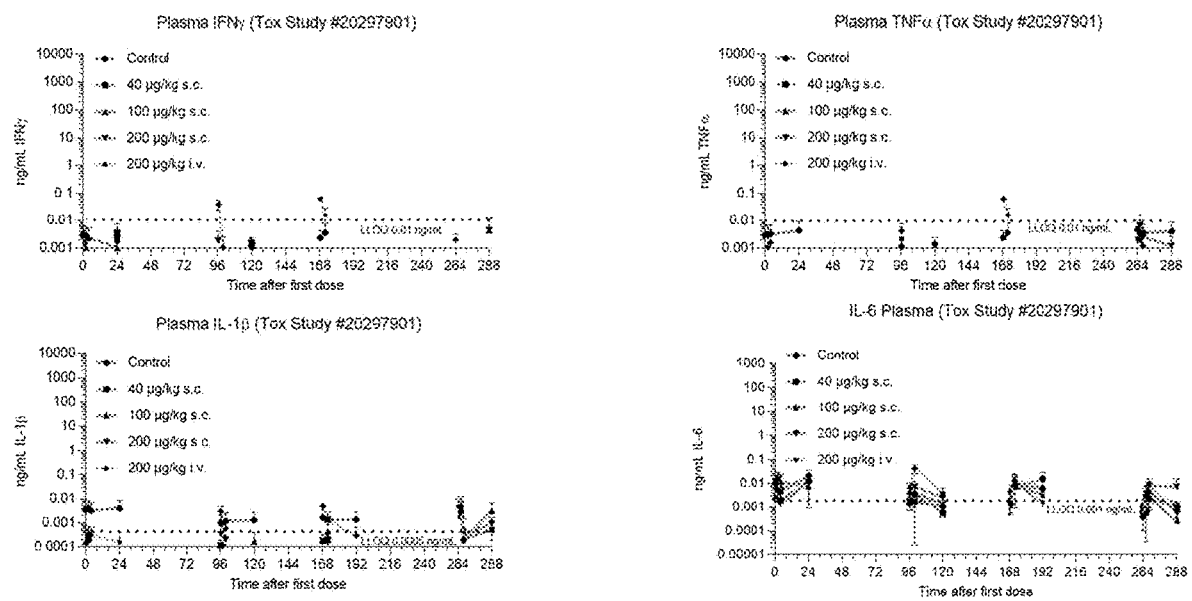
FIG. 4 non-human primate serum cytokine levels obtained from diakine exposure in vivo.

Without being bound to any particular theory, the inventor believes that the similarities between the cytokines induced by treatment with IL-2 alone, and the apparent blockade of the induction of these secondary cytokines by a diakine comprising IL-10 (e.g., $DK2^{10}$ (EGFR)) or IL-4, IL-12, IL-15, IL-7, or any combination thereof will suppress or block IL-2 mediated CRS. Others have shown that the addition of tumor cells expressing specific tumor associated antigens (TAA) to PBMC with a titration range of an anti-TAA:anti-CD3 BiTE leads to the induction of a range of proinflammatory cytokines. (Fu, 2019). It also appears that BiTE stimulation temporally leads to the initial induction of TNFα, IL-2 and IL-4, followed by the other cytokines. (Brandl, 2007). The level of IFNγ, IL-6, and TNFα induction from PBMCs in response to exposure to anti-CD3 in the presence of a diakine ($DK2^{10}$ EGFR), IL-10, and IL-2, suggest that the presence of $DK2^{10}$ (EGFR) prevents the induction of significant secondary proinflammatory cytokines associated with CRS, unlike the increasing concentration of IL-2. FIG. 2. In addition, the fusion of IL-2 with the high affinity EBV IL-10 (internally termed DV07, Seq ID No: 5), which is known as $DK2^{10}$EGFR, prevents the induction of IL-2 mediated secondary cytokines both from PBMC and from anti-CD3 stimulated PBMC. FIG. 2. Further investigation of whether coupling IL-10 to IL-2 indicates that the application of $DK2^{10}$(EGFR) to mice prevents the induction of peripheral cytokines induced by IL-2 alone. FIG. 3. Furthermore, the treatment of non-human primates with $DK2^{10}$ (EGFR) similarly does not lead to significant inductions of peripheral plasma cytokines. FIG. 4.

Figure 5:
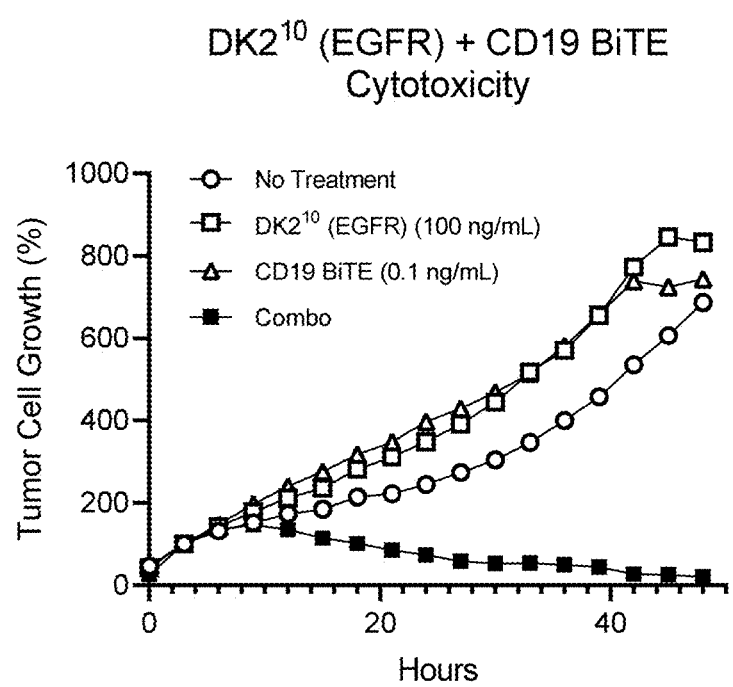
FIG. 5 graphs measuring cytotoxicity of CD8+ T cell exposed to diakine and BiTE.
Figure 6:
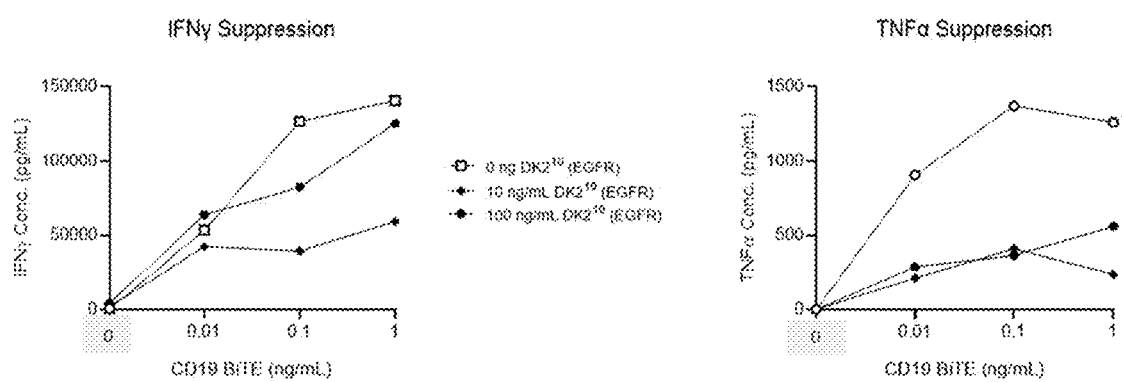
FIG. 6 graphs measuring IFNg and TNFa levels in CD8+ T cells exposed to varying concentrations of BiTE.
Figure 7:
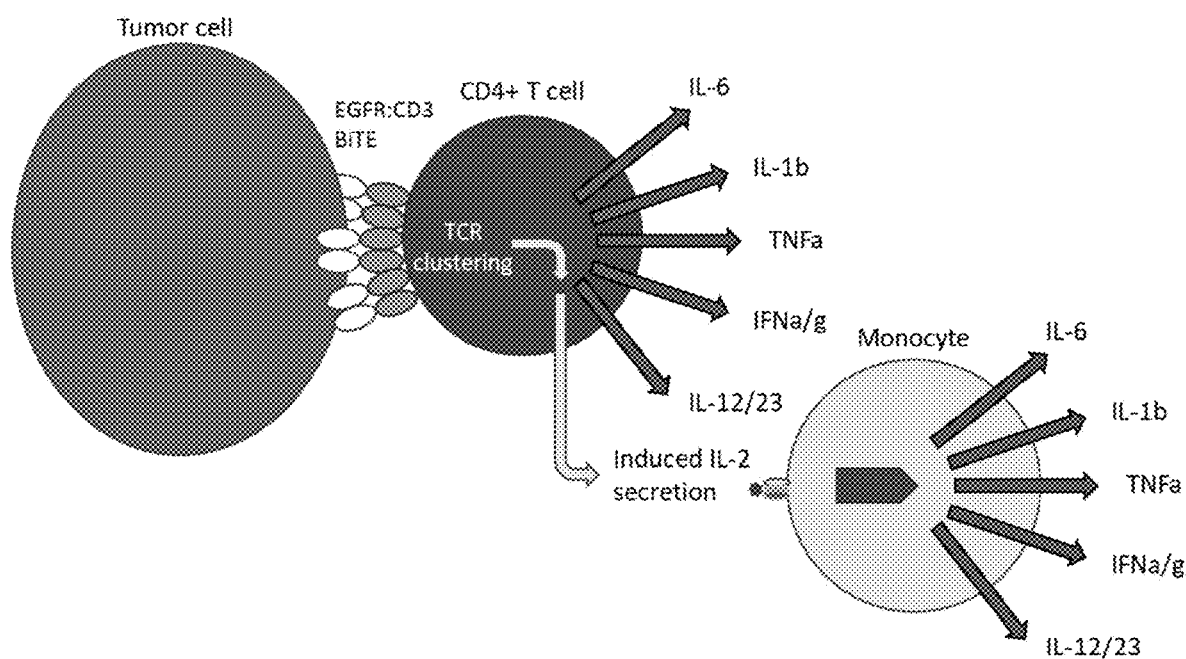
FIG. 7 schematic diagram of proposed IL-2 mediated CRS circuit in response to BiTE or CAR-T therapy.

Moreover, pre-exposure of CD8+ T cells to a diakine (e.g., $DK2^{10}$ (EGFR)) dramatically enhances the cells subsequent capacity to engage BiTE's and effect cytolysis of tumor cells. FIG. 5. Furthermore, these cells appear to secrete similar levels of IFNγ, but lower levels of TNFα compared to BiTE alone stimulated cells. FIG. 6. Thus, the inventor believes that the molecular circuit responsible for BiTE or CAR-T mediated CRS is a cascade of pro-inflammatory cytokine release, that is first triggered by CD4+ T cell engagement with BiTE or CAR-T, which subsequently triggers IL-2 secretion and inducement of monocyte/macrophage to undergo additional secretion of proinflammatory cytokines. FIG. 7 from monocytes/macrophages.

Example 1: Diakine Enhances BiTE Mediated Tumor Cell Cytolysis $DK2^{10}$ (EGFR) has been previously shown to prime CD8+ T cell for subsequent tumor cytolysis in vitro and in vivo. See, U.S. Pat. No. 11,292,822. Here, $DK2^{10}$ (EGFR), which is a representative example of a diakine, is shown to both enhance BiTE mediated tumor cell cytolysis as well as suppress BiTE mediated CRS.

Initially, $DK2^{10}$ (EGFR) is shown to enhance BiTE mediated tumor cell cytotoxicity. In this in vitro model, the combinatorial anti-tumor effects of $DK2^{10}$ (EGFR) with the CD19 BiTE is assessed in multiple rounds of exposure to target tumor cells.

CD8+ T cells are isolated from fresh donor Leukopaks via magnetic bead isolation per the manufacturer's suggested protocol (Miltenyi). The isolated CD8+ T cells are plated at $2.5 \times 10^6$ cells/well and exposed for 2 days in various concentrations (0 or 100 ng/mL) of $DK2^{10}$ (EGFR) in AIMV.

Following the 2 days of exposure to the various concentrations of DK2$^{10}$ (EGFR), the CD8+ T cells are harvested, counted, washed, and finally resuspended in the corresponding concentration of DK2$^{10}$ (EGFR). Concurrently, Raji cells, which constitutively express Green Florescent Protein (GFP), are counted, washed and resuspended in varying concentrations (0 or 0.1 ng/mL) of CD19 BiTE. The CD8+ cells (effector) and Raji-GFP cells (target) are then combined at a 10:1 effector to target ratio. The mixture of effector and target cells, which are exposed to CD19 BiTE alone, DK2$^{10}$ (EGFR) alone, or the combination of CD19 BiTE and DK2$^{10}$ (EGFR), were monitored over 5 days using an IncuCyte® S3 Live-Cell Analysis System (Essen Bioscience/Sartorius). In conjunction, additional plates were seeded with the same conditions as stated above to be used for subsequent and serial rounds of the cytotoxicity assay. Every 3 days media is aspirated from wells and fresh media, with appropriate concentrations of either DK2$^{10}$ (EGFR), CD19 BiTE, or the combination of the two, are added to the wells. Following the 5-day exposure, cells are harvested, counted, washed, and re-exposed to the similar conditions as stated previously. The percentage of (GFP) disappearance is measured as an indicator of cytotoxicity.

Figure 8:
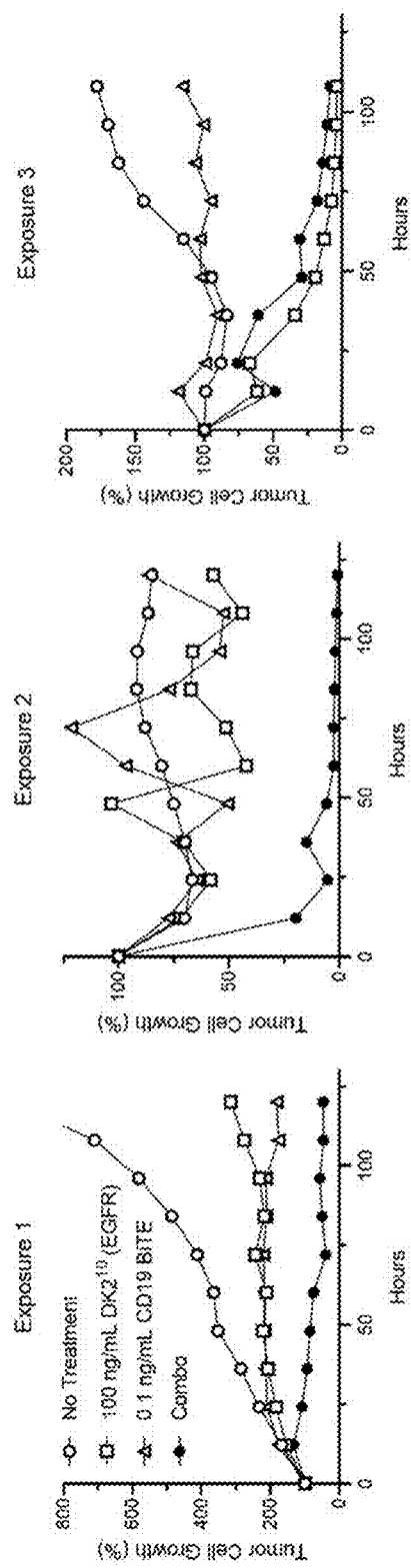
FIG. 8 combination of a diakine comprising IL-10 and IL-2 which targets EGFR in combination with CD3×CD19 BiTE enhances CD8+ T cell directed tumor cell cytolysis.

CD3×CD19 BiTE when combined with DK2$^{10}$ (EGFR) enhances tumor cell cytotoxicity. See, FIGS. 5 and 8. CD3XCD19 BiTE and DK2$^{10}$ (EGFR) are tested both alone and in combination using normal, healthy human donor derived CD8+ T cells. FIG. 8. Effector cells went through multiple rounds (5 rounds of serial cytolysis) of exposure to target tumor cells (Raji-GFP), and cytotoxicity was measured via the disappearance of GFP. In vitro treatment with the BiTE in combination with DK2$^{10}$ (EGFR) suggests that activation of T cells with DK2$^{10}$ (EGFR) enhances responses to BITE's when assessing CD8+ T cell anti-Raji$^{GFP+}$ responses.

Example 2: Diakine Reduces BiTE Mediated CRS

One of the current clinical challenges with BiTE's is the significant induction of CRS (Zhou, 2021). Since diakine (e.g., DK2$^{10}$ (EGFR)) treatment of peripheral blood derived mononuclear cells (PBMC), tumor-bearing mice and non-human primates (see, FIGS. 1, 3, and 4) appears to prevent IL-2 mediated CRS, in vitro cultures comprising PBMC, Raji$^{GFP+}$ cells, 0.1 ng/mL CD19 BiTE with or without 100 ng/mL DK2$^{10}$ (EGFR) are used to determine whether DK2$^{10}$ (EGFR) is capable of suppressing BiTE mediated CRS.

PBMCs are isolated from Leukopaks collected from healthy donors using the Ficoll density gradient method. Equal volumes of HBSS and donor samples were transferred to conical tubes, individually. Ficoll was slowly added to create a bottom layer then samples were centrifuged at 400×g for 30 minutes at 25° C. PBMCs were harvested from the top layer then washed twice using Aim V media (300×g, 8 minutes). The isolated PBMCs were plated at 2×10$^6$ cells/well in various concentrations (0 or 100 ng/mL) of DK2$^{10}$ EGFR in AIMV then incubated for two days (37° C., 5% CO$_2$). Raji tumor cells were counted, washed and resuspended in varying concentrations of CD19 BiTE (0, or 0.1 ng/mL final), with or without DK2$^{10}$ (EGFR) (100 ng/mL) using AIMV and allowed to prime for two-days. The PBMCs, assuming 10% CD8+ T cells (effector), and Raji cells (target) were combined at a 10:1 effector to target ratio. After 24-hour incubation, supernatants are harvested and cytokine secretion was measured via multiplexed capture assay (MSD) and ELISA.

Figure 9:
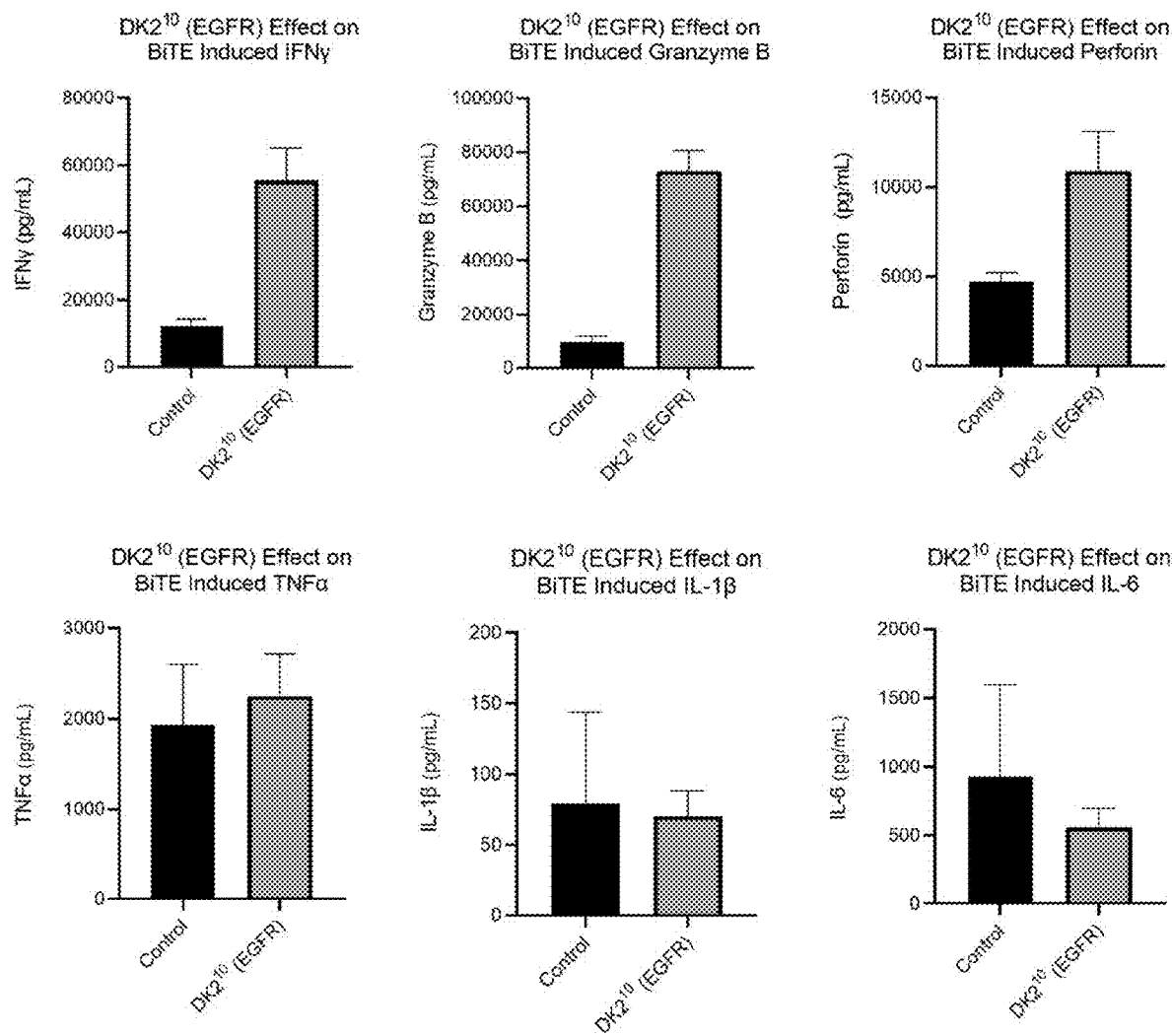
FIG. 9 combination of a diakine (DK2[10] EGFR) with CD3×CD19 BiTE exhibits enhanced cytolytic effector molecules and controlled CRS FIG. 10 intracellular FACS analysis of a diakine (DK2[10] EGFR) and CD3×CD19 BiTE treatment of PBMC cultures containing Raji$^{GFP+}$ tumor cells
Figure 10:
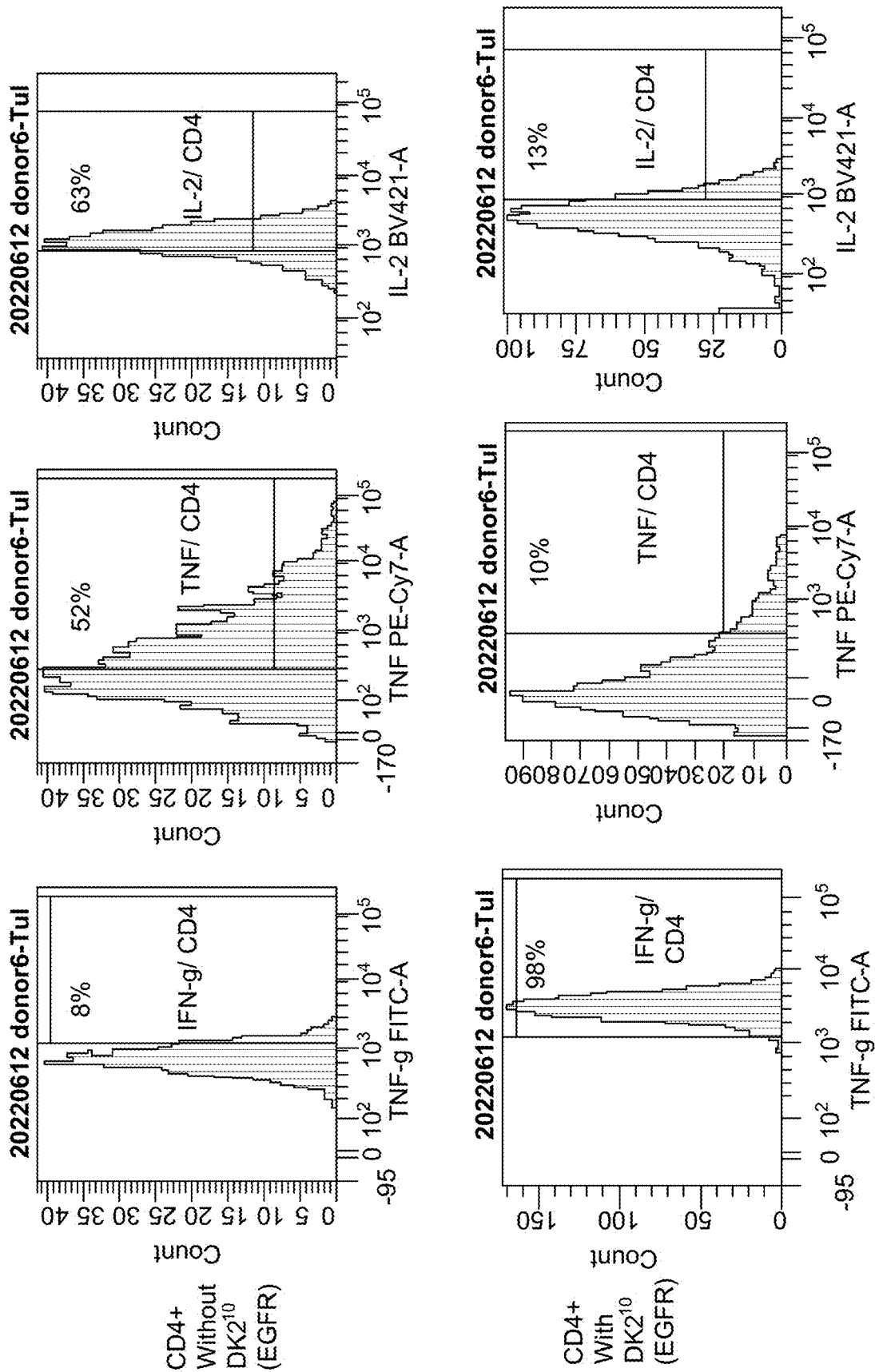
Figure 10:
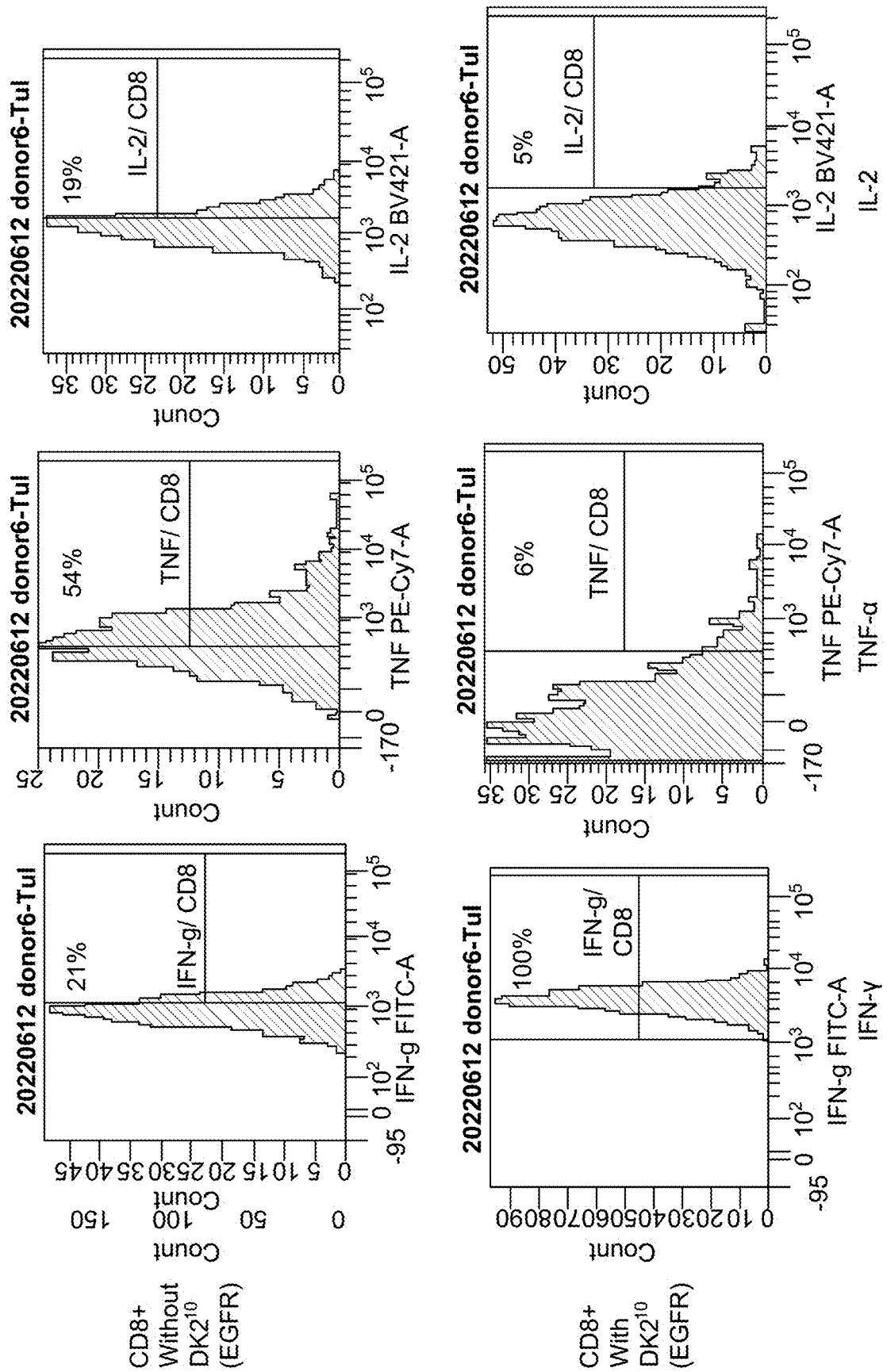
Figure 10:
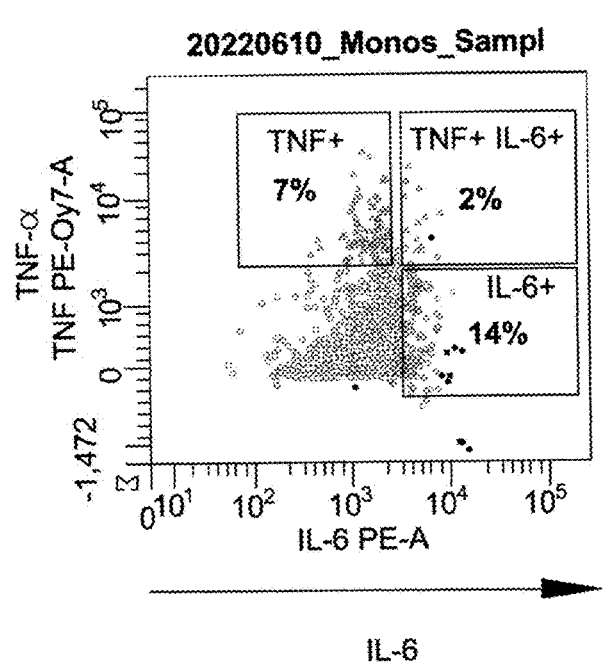
Figure 10:
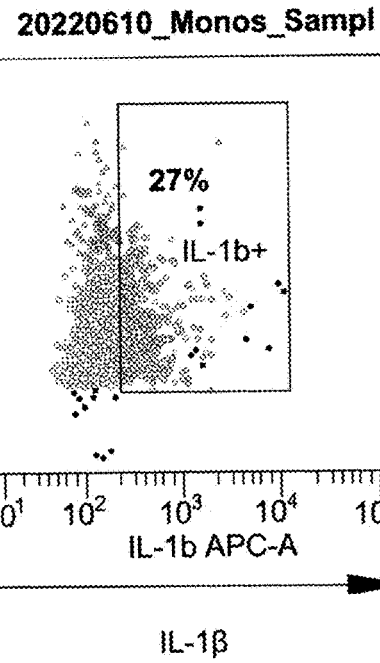
Figure 10:
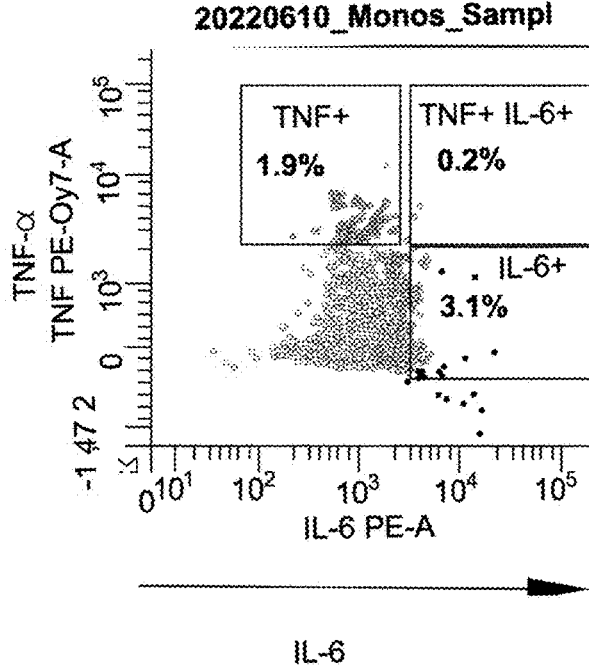
Figure 10:
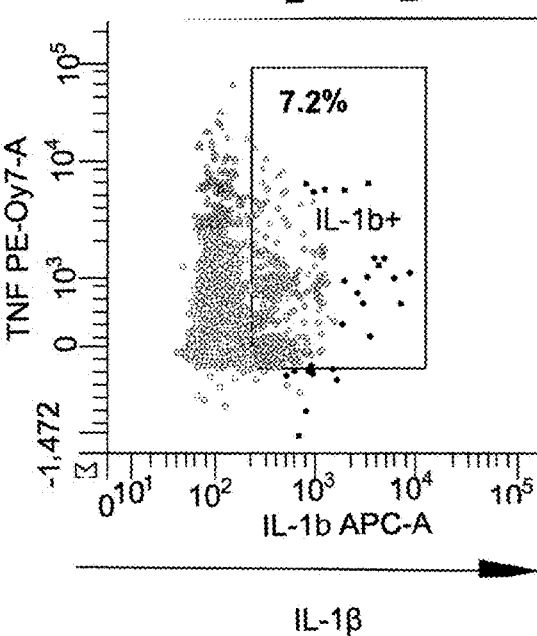

Illustrated in FIG. 9, the data suggests that the presence of DK2$^{10}$ (EGFR) under these conditions significantly promotes tumor cell lysis (induction of IFN-gamma, Granzyme B, and Perforin) while limiting the induction of BiTE mediated CRS at a non-functional concentration of BiTE (0.1 ng/mL). Represented data is taken at 24 hrs., from exposure 1. Longitudinal data indicates a reduction of CRS over time in these conditions. FIG. 10.

To better understand the cell types present in the PBMC+Raji$^{GFP+}$ cultures that are affected by DK2$^{10}$ (EGFR), we assessed 48-hour cultures by intracellular fluorescence activated cell sorting (FACS). This analysis, suggests that the presence of DK2$^{10}$ (EGFR) polarizes both CD4+ and CD8+ T cells to predominantly express IFN-gamma, while reducing TNFalpha and IL-2 production. MHC II positive cells, denoted as antigen-presenting cells (APC's), also exhibit reduced TNFalpha, IL-6 and IL-1-beta production, suggesting DK2$^{10}$ (EGFR) mediates pleiotropic cell type control of CRS associated with BiTE mediated T cell activation. FIG. 10.

REFERENCES

BIBLIOGRAPHY Bosco, M. C. (2000). 11-2 Signaling in Human Monocytes Involves the Phosphorylation and Activation of p59hck1. *Journal of Immunology*.

Brandl, C. (2007). The effect of dexamethasone on polyclonal T cell activation and redirected target cell lysis as induced by a CD19 CD3 bispecific single-chain antibody construct. *Cancer Immunology Immunotherapy*.

Chen, Y. (2021). Therapeutic Potential of TNFa and IL-1b Blockade for CRS/ICANS in CART Therapy via Ameliorating Endothelial Activation. *Frontiers in Immunology*.

Hosseini, I. (2020). Mitigating the risk of cytokine release syndrome in Phase I trial of CD20CD3 bispecific antibody mosunetuzumab in NHL impact of translational system modeling. *Systems Biology and Applications*.

Fu et al (1029). Therapeutic Bispecific T-Cell Engager Antibody Targeting the Transferrin Receptor. *Frontiers in Immunology*.

Liu, D. (2018). Cytokine release syndrome; grading, modeling, and new therapy. *Journal of Hematology and Oncology*.

Maude, S. L. (2014). Managing Cytokine Release Syndrome Associated with Novel T Cell-Engaging Therapies. *Cancer Journal*.

Musso, T. (1992). IL-2 Induces IL-6 Production in Human Monocytes. *Journal of Immunology*.

Norelli, M. (2018). Monocyte-derived IL-1 and IL-6 are differentially required for cytokine release syndrome and neurotoxicity due to CAR T cells. *Nature Medicine*.

Shimabukuro-Vornhagen, A. (2018). Cytokine release syndrome. *Journal of Immuno Therapy of Cancer*.

Strieter, R. M. (1989). Interleukin-2-induced Tumor Necrosis Factor-alpha Gene Expression in Human Alveolar Macrophages and Blood Monocytes. *American Review Respiratory Disease*.

The invention claimed is:

1. A method of reducing cytokine release syndrome (CRS) severity induced by using a bispecific antibody or chimeric antigen receptor T cell (CAR-T) during treatment of a malignant disease and enhancement of tumor cytolysis comprising administering to a patient in need thereof (a) an amount of a composition comprising a dual cytokine fusion protein of Formula II $$NH_2\text{-}(Y)\text{-}(X^1)\text{-}(Z_n)\text{-}(X^2)\text{-}(Y)\text{-}COOH \quad \text{(Formula II)}$$

wherein

"Y" is a monomer of IL10 comprising a sequence of SEQ ID No.: 5, or a variant thereof;

"$X^1$" is a VL or VH region from a first monoclonal antibody;

"$X^2$" is a VH or VL region from the first monoclonal antibody;

wherein when $X^1$ is a VL, $X^2$ is a VH or when $X^1$ is a VH, $X^2$ is a VL, wherein the first monoclonal antibody is an anti-ebola antibody;

wherein the VL and VH from the anti-ebola antibody include 3 light chain CDRs and 3 heavy chain CDRs that are engrafted with 3 light chain CDRs and 3 heavy chain CDRs from an anti-EGFR monoclonal antibody;

"Z" is an IL-2; and

"n" is an integer of 1; and (b) an amount of a bispecific antibody or CAR-T, wherein the bispecific antibody comprises specificity for a CD3 and a tumor associated antigen, wherein the administering reduces induction of pro-inflammatory cytokines IL-1β, IL-6, TNFα, IL-12, IFNα, IFNγ, IL-23, or any combination thereof.

2. The method according to claim 1, wherein the dual cytokine fusion protein further comprises a scFv targeting domain that targets a receptor different from the bispecific antibody or CAR-T.

3. The method according to claim 1, wherein the bispecific antibody or CAR-T therapy targets a hematological or solid tumor.

4. The method according to claim 1, wherein the bispecific antibody or CAR-T targets an antigenic determinant selected from TNFRSF17, IL3RA, SDC1, CD5, CD19, CD20, CD22, CD23, CD33, CD38, CD44, CD70, CD133, CD174, CD274, CD276, CEACAM6, GFRA1, ITGB6, MS4A1, TNFRSF8, NCAM1, ULBP1, ULBP2, IL1RAP, CEACAM5 (CEA), MET, EGFR, EGFRvIII, ENPP1, DLL3, CLDN18, BCAM, PSMA, MUC17, HER2, HER3, FGFR4, EPCAM, EPHA2, ERBB2, GPC3, MSLN, Muc1, PDCD1, KDR, IL13RA2, FOLH1, FAP, CA9, FOLR1, L1CAM, ROR1, SLAMF7, GD2, 5T4, PSCA, GPNMB, CSPG4, PDGFR, PDL1, PD1 or TEM1.

5. The method according to claim 1, wherein the CAR-T therapy is idecabtagene vicleucel, lisocabtagene maraleucel, brexucabtagene autoleucel, tisagenlecleucel, or axicabtagene ciloleucel.

* * * * *

SEQUENCE LISTING

```
Sequence total quantity: 17
SEQ ID NO: 1               moltype = AA  length = 178
FEATURE                    Location/Qualifiers
REGION                     1..178
                           note = Human IL-10 Amino Acid Sequence
source                     1..178
                           mol_type = protein
                           organism = synthetic construct
SEQUENCE: 1
MHSSALLCCL VLLTGVRASP GQGTQSENSC THFPGNLPNM LRDLRDAFSR VKTFFQMKDQ   60
LDNLLLKESL LEDFKGYLGC QALSEMIQFY LEEVMPQAEN QDPDIKAHVN SLGENLKTLR  120
LRLRRCHRFL PCENKSKAVE QVKNAFNKLQ EKGIYKAMSE FDIFINYIEA YMTMKIRN    178

SEQ ID NO: 2               moltype = DNA  length = 1629
FEATURE                    Location/Qualifiers
misc_feature               1..1629
                           note = Human IL-10 Nucleic Acid Sequence
source                     1..1629
                           mol_type = other DNA
                           organism = synthetic construct
SEQUENCE: 2
acacatcagg ggcttgctct tgcaaaacca aaccacaaga cagacttgca aaagaaggca    60
tgcacagctc agcactgctc tgttgcctgg tcctcctgag tggggtgagg gccagcccag   120
gccagggcac ccagtctgag aacagctgca cccacttccc aggcaacctg cctaacatgc   180
ttcgagatct ccgagatgcc ttcagcagag tgaagacttt ctttcaaatg aaggatcagc   240
tggacaactt gttgttaaag gagtccttgc tggaggactt taagggttac ctgggttgcc   300
aagccttgtc tgagatgatc cagttttacc tggaggaggt gatgccccaa gctgagaacc   360
aagacccaga catcaaggcg catgtgaact ccctggggga gaacctgaag accctcaggc   420
tgaggctacg gcgctgtcat cgatttcttc cctgtgaaaa caagagcaag gccgtggagc   480
aggtgaagaa tgcctttaat aagctccaag agaaaggcat ctacaaagcc atgagtgagt   540
ttgacatctt catcaactac atagaagcct acatgacaat gaagatacga aactgagaca   600
tcagggtggc gactctatag actctaggac ataaattaga ggtctccaaa atcggatctg   660
gggctctggg atagctgacc cagccccttg agaaacctta tgtacctctc ttatagaat    720
atttattacc tctgatacct caaccccatt ttctatttat ttactgagct ctctcgtgaa   780
cgatttagaa agaagcccaa tattataatt ttttcaata tttattattt tcacctgttt    840
ttaagctgtt tccatagggt gacacactat ggtatttgag tgttttaaga taaattataa   900
gttacataag ggaggaaaaa aaatgttctt tggggagcca acagaagctt ccattccaag   960
cctgaccacg ctttctagct gttgagctgt tttccctgac ctccctctaa tttatcttgt  1020
ctctgggctt ggggcttcct aactgctaca aatactctta ggaagagaaa ccaggagcc   1080
cctttgatga ttaattcacc ttccagtgtc tcggagggat tccccttaacc tcattcccca  1140
accacttcat tcttgaaagc tgtgccagc ttgttattta taacaaccta aatttggttc   1200
taggccgggc gcggtggctc acgcctgtaa tcccagcact tgggaggct gaggcgggtg   1260
gatcacttga ggtcaggagt tcctaaccag cctggtcaac atggtgaaac cccgtctcta  1320
ctaaaaatac aaaaattagc cgggcatggt ggcgcgcacc tgtaatccca gctacttggg  1380
aggctgaggc aagagaattg cttgaaccca ggagatgaa gttgcagtga gctgatatca   1440
tgcccctgta ctccagcctg ggtgacagag caagactctg tctcaaaaaa taaaaataaa  1500
aataaatttg gttctaatag aactcagttt taactagaat ttattcaatt cctctgggaa  1560
tgttacattg tttgtctgtc ttcatagcag attttaattt tgaataaata aatgtatctt   1620
attcacatc                                                          1629

SEQ ID NO: 3               moltype = AA  length = 147
FEATURE                    Location/Qualifiers
REGION                     1..147
                           note = EBV IL-10 Amino Acid Sequence
source                     1..147
                           mol_type = protein
                           organism = synthetic construct
SEQUENCE: 3
TDQCDNFPQM LRDLRDAFSR VKTFFQTKDE VDNLLLKESL LEDFKGYLGC QALSEMIQFY   60
LEEVMPQAEN QDPEAKDHVN SLGENLKTLR LRLRRCHRFL PCENKSKAVE QIKNAFNKLQ  120
EKGIYKAMSE FDIFINYIEA YMTIKAR                                      147

SEQ ID NO: 4               moltype = DNA  length = 632
FEATURE                    Location/Qualifiers
misc_feature               1..632
                           note = EBV IL-10 Nucleic Acid Sequence
source                     1..632
                           mol_type = other DNA
                           organism = synthetic construct
SEQUENCE: 4
tataaatcac ttccctatct caggtaggcc tgcacacctt aggtatggag cgaaggttag    60
tggtcactct gcagtgcctg gtgctgcttt acctggcacc tgagtgtgga ggtacagacc   120
aatgtgacaa ttttccccaa atgttgaggg acctaagaga tgccttcagt cgtgttaaaa   180
ccttttttca gacaaaggac gaggtagata acctttttgct caaggagtct ctgctagagg  240
actttaaggg ctaccttgga tgccaggccc tgtcagaaat gatccaattc tacctgagg    300
aagtcatgcc acaggctgaa aaccaggacc ctgaagccaa agaccatgtc aattctttgg   360
gtgaaaatct aaagaccctta cggctccgcc tgcgcaggtg ccacaggttc ctgccgtgtg   420
agaacaagag taaagctgtg gaacagataa aaaatgcctt taacaagctg caggaaaaag   480
```

```
gaatttacaa agccatgagt gaatttgaca tttttattaa ctacatagaa gcatacatga    540
caattaaagc caggtgataa ttccataccc tggaagcagg agatgggtgc atttcacccc    600
aaccccccct ttcgactgtc atttacaata aa                                  632

SEQ ID NO: 5            moltype = AA   length = 147
FEATURE                 Location/Qualifiers
REGION                  1..147
                        note = DV07 Amino Acid Sequence
source                  1..147
                        mol_type = protein
                        organism = synthetic construct
SEQUENCE: 5
TDQCDNFPQM LRDLRDAFSR VKTFFQTKDE LDNLLLKESL LEDFKGYLGC QALSEMIQFY     60
LEEVMPQAEN QDPEIKDHVN SLGENLKTLR LRLRRCHRFL PCENKSKAVE QIKNAFNKLQ    120
EKGIYKAMSE FDIFINYIEA YMTIKAR                                        147

SEQ ID NO: 6            moltype = DNA   length = 441
FEATURE                 Location/Qualifiers
misc_feature            1..441
                        note = DV07 Nucleic Acid Sequence
source                  1..441
                        mol_type = other DNA
                        organism = synthetic construct
SEQUENCE: 6
accgaccagt gcgacaactt ccctcagatg ctgcgggacc tgagagatgc cttctccaga     60
gtgaaaacat tcttccagac caaggacgag ctggacaacc tgctgctgaa agagtccctg    120
ctggaagatt tcaagggcta cctgggctgt caggccctgt ccgagatgat ccagttctac    180
ctggaagaag tgatgcccca ggccgagaat caggaccccg agatcaagga ccacgtgaac    240
tccctgggcg agaacctgaa aaccctgcgg ctgagactgc ggcggtgcca cagatttctg    300
ccctgcgaga acaagtccaa ggccgtggaa cagatcaaga acgccttcaa caagctgcaa    360
gagaagggca tctacaaggc catgagcgag ttcgacatct tcatcaacta catcgaggcc    420
tacatgacca tcaaggccag a                                              441

SEQ ID NO: 7            moltype = AA   length = 713
FEATURE                 Location/Qualifiers
REGION                  1..713
                        note = DK210egfr Amino Acid Sequence
source                  1..713
                        mol_type = protein
                        organism = synthetic construct
SEQUENCE: 7
TDQCDNFPQM LRDLRDAFSR VKTFFQTKDE LDNLLLKESL LEDFKGYLGC QALSEMIQFY     60
LEEVMPQAEN QDPEIKDHVN SLGENLKTLR LRLRRCHRFL PCENKSKAVE QIKNAFNKLQ    120
EKGIYKAMSE FDIFINYIEA YMTIKARGGG GSGGGGSGGG GSQVQLQQWG AGLLKPSETL    180
SLTCAVYGFS LTNYGVHWIR QPPGKGLEWL GVIWSGGNTD YNTPFTSRVA ISKDNSKNQV    240
SLRLNSVTAA DTAIYYCARA LTYYDYEFAY WGKGTTVTVS SGGGGSGGGG SGGGGSAPTS    300
SSTKKTQLQL EHLLLDLQMI LNGINNYKNP KLTRMLTFKF YMPKKATELK HLQCLEEELK    360
PLEEVLNLAQ SKNFHLRPRD LISNINVIVL ELKGSETTFM CEYADETATI VEFLNRWITF    420
CQSIISTLTG GGGSGGGGSG GGGSEIVLTQ SPGTLSLSPG ERATLSCRAS QSIGTNIHWY    480
QQKPGQAPRL LIKYASESIS GFPDRFSGSG SGTDFTLTIT RLEPEDFAMY YCQQNNNWPT    540
TFGQGTKLEI KGGGGSGGGG SGGGGSTDQC DNFPQMLRDL RDAFSRVKTF FQTKDELDNL    600
LLKESLLEDF KGYLGCQALS EMIQFYLEEV MPQAENQDPE IKDHVNSLGE NLKTLRLRLR    660
RCHRFLPCEN KSKAVEQIKN AFNKLQEKGI YKAMSEFDIF INYIEAYMTI KAR            713

SEQ ID NO: 8            moltype = DNA   length = 2208
FEATURE                 Location/Qualifiers
misc_feature            1..2208
                        note = DK210egfr Nucleic Acid Sequence
source                  1..2208
                        mol_type = other DNA
                        organism = synthetic construct
SEQUENCE: 8
gccgccacca tgggatggtc tttgatcctg ctgttcctgg tggccgtggc taccagagtg     60
cattctaccg accagtgcga caacttccct cagatgctgc gggacctgag ggacgccttc    120
tccagagtga aaacattctt ccagaccaag gacgagctgg acaacctgct gctgaaagag    180
tccctgctgg aagatttcaa gggctacctg gctgtcaggc cctgtccga gatgatccag    240
ttctacctga agaagtgat gccccaggcc gagaatcagg accctgagat caaggaccat    300
gtgaactccc tgggcgagaa cctgaaaacc ctgcggctga gactgcggcg gtgtcacaga    360
tttctgccct gcgagaacaa gtccaaggcc gtggaacaga tcaagaacgc cttcaacaag    420
ctgcaagaga aggccatcta caaggccatg agcgagttcg acatcttcat caactacatc    480
gaggcctaca tgaccatcaa ggctagaggt ggcggaggat ctggcggtgg tggttctggc    540
ggaggcggat ctcaggttca gttgcaacaa tggggcgctg gcctgctgaa gccttctgag    600
acactgtctc tgacctgcgc cgtgtacggc ttctctctga ccaattacgg cgtgcactgg    660
atccggcagc cacctggaaa aggactggaa tggctgggaa tgtgatttttggag cggcggaag    720
accgactaca acaccccttt tacctctaga gtgccatctc caaggacaa ctccaagaac    780
caggtgtccc tgagactgaa ctctgtgacc gccgctgata ccgccatcta ctactgtgct    840
agagccctga cctactacga ctacgagttc gcttattggg gcaagggcac caccgtgaca    900
gtttcatctg gcggcggagg aagcggtggc ggcggtagcg gaggtggtgg atctgctcct    960
acctcctcca gcaccaagaa aacccagctg cagttggagc atcgctgctg ggacctcag   1020
```

```
atgatcctga acggcatcaa caactacaag aatcccaagc tgacccggat gctgaccttc  1080
aagttctaca tgcccaagaa ggccaccgag ctgaaacatc tgcagtgcct ggaagaggaa  1140
ctgaagcccc tcgaggaagt gctgaatctg gcccagtcca agaacttcca cctgaggcct  1200
agggacctga tctccaacat caacgtgatc gtgctcgagc tgaagggctc cgagacaacc  1260
tttatgtgcg agtacgccga cgagacagcc accatcgtga aatttctgaa ccggtggatc  1320
accttctgcc agtccatcat ctctacattg accggtggtg gcggatcagg cggtggcgga  1380
agcggaggcg gaggttctga aattgtgctg acccagtctc ctggcactct gtctttgagt  1440
cctggcgaga gagctaccct gtcctgcaga gcttctcagt ccatcggcac caacatccac  1500
tggtatcagc agaagcctgg acaggccccc cggctgctga ttaagtacgc ctctgagtcg  1560
atcagcggct tccctgacag attctctggc tctggatctg gcaccgactt caccctgacc  1620
atcaccgaca tggaacccga ggacttcgct atgtactact gccagcagaa caacaactgg  1680
cccaccacct ttggccaggg caccaagttg gaaatcaaag gtggcggtgg aagtggcggc  1740
ggtggctcag gcggcggtgg atctacagac cagtgtgata attttccaca gatgctcagg  1800
gatctccgcg acgccttttag ccgggtcaag acatttttc agacaaagga tgaactcgat  1860
aatctcctgc tcaaagagag cctgctcgag gactttaaag gatacctggg atgccaggct  1920
ctcagcgaaa tgattcagtt ttatttggag gaagtcatgc ctcaagctga aaaccaggat  1980
ccagagatta aggatcacgt caacagcctc ggcgagaatc tcaagacact gcgcctgagg  2040
ctgagaagat gccaccggtt tctgccttgt gaaaacaaga gcaaggctgt cgagcagatt  2100
aagaatgctt ttaacaaatt gcaagaaaaa gggatctata aggctatgtc tgagtttgat  2160
atctttatca attatatcga agcttatatg actattaagg cccggtga               2208

SEQ ID NO: 9           moltype = AA   length = 733
FEATURE                Location/Qualifiers
REGION                 1..733
                       note = DK210her2 (Variant 4)
source                 1..733
                       mol_type = protein
                       organism = synthetic construct
SEQUENCE: 9
MGWSLILLFL VAVATRVHST DQCDNFPQML RDLRDAFSRV KTFFQTKDEL DNLLLKESLL    60
EDFKGYLGCQ ALSEMIQFYL EEVMPQAENQ DPEIKDHVNS LGENLKTLRL RLRRCHRFLP   120
CENKSKAVEQ IKNAFNKLQE KGIYKAMSEF DIFINYIEAY MTIKARGGGG SGGGGSGGGG   180
SQVQLQEWGA GLLKPSETLS LTCAASGFNI KDTYIHWVRQ PPGKGLEWVA RIYPTNGYTR   240
YADSVKGRFA ISADTSKNQA SLRLNSVTAA DTAVYYCSRW GGDGFYAMDY WGKGTTVTVS   300
SGGGGSGGGG SGGGGSAPTS SSTKKTQLQL EHLLLDLQMI LNGINNYKNP KLTRMLTFKF   360
YMPKKATELK HLQCLEEELK PLEEVLNLAQ SKNFHLRPRD LISNINVIVL ELKGSETTFM   420
CEYADETATI VEFLNRWITF CQSIISTLTG GGGSGGGGSG GGGSEIVMTQ SPGTLSLSPG   480
ERATLSCRAS QDVNTAVAWY QQKPGQAPRL LIYSASFLYS GVPDRFSGSR SGTDFTLTIT   540
RLEPEDFATY YCQQHYTTPP TFGQGTKLEI KGGGGSGGGG SGGGGSTDQC DNFPQMLRDL   600
RDAFSRVKTF FQTKDELDNL LLKESLLEDF KGYLGCQALS EMIQFYLEEV MPQAENQDPE   660
IKDHVNSLGE NLKTLRLRLR RCHRFLPCEN KSKAVEQIKN AFNKLQEKGI YKAMSEFDIF   720
INYIEAYMTI KAR                                                    733

SEQ ID NO: 10          moltype = DNA  length = 2303
FEATURE                Location/Qualifiers
misc_feature           1..2303
                       note = DK210her2 Variant 4 Nucleic Acid Sequence
source                 1..2303
                       mol_type = other DNA
                       organism = synthetic construct
SEQUENCE: 10
atcgaaatta atacgactca ctatagggag acccaagctg gctagcgccg ccaccatggg    60
atggtctttg atcctgctgt tcctggtggc cgtggctacc agagtgcatt ctaccgacca   120
gtgcgacaac ttccctcaga tgctgcggga cctgagagat gccttctcca gagtgaaaac   180
attcttccag accaaggacg agctggacaa cctgctgctg aaagagtccc tgctggaaga   240
tttcaagggc tacctgggct gtcaggccct gtccgagatg atccagttct acctggaaga   300
agtgatgccc caggccgaga tcagggaccc cgagatcaag gaccacgtga actccctggg   360
cgagaacctg aaaaccctgc ggctgagact gcggcggtgc cacagatttc tgccctgcga   420
gaacaagtcc aaggccgtgg aacagatcaa gaacgccttc aacaagctgc aagagaaggg   480
catctacaag gccatgagcg agttcgacat cttcatcaac tacatcgagg cctacatgac   540
catcaaggcc agaggcggcg gaggatctgg cggaggtgga agcggaggcg gtggatctca   600
ggtgcagttg caagaatggg gcgctggcct gctgaagcct tccgaaacac tgtctctgac   660
ctgcgccgcc agcggcttca acatcaagga cacctacatc cactgggtcc gacagcctcc   720
aggcaaagga ctgaattggg tcgcgcagaat ctaccccaca ccagatacgc   780
cgactctgtg aagggcagat cgccatctc tgccgacacc tccaagaacc aggccagcct   840
gagactgaac tctgtgaccg ctgctgacac cgccgtgtac tactgctcta tgggggcgg   900
agatggcttc tacgccatgg actattgggg caagggcacc accgtgacag ttagtagtgg   960
tggtggcggt agtggcggag gcggcaggg cggtggtgga tctacagacc atcctccag  1020
caccaagaaa acccagctgc agttggagca tcgctgctg gacctccaga tgatcctgaa  1080
cggcatcaac aactcaaga accccaagct gaccccggatg ctgaccttca gttctctat  1140
gcccaagaag gccaccgagc tgaaacatct tgcagtgcctg gaagaggaac tgaagcccct  1200
cgaggaagtg ctgaatctgg cccagtccaa gaacttccac ctgaggccta ggacctgat  1260
ctccaacatc aacgtgatcg tgctcgagct gaagggctcc gagacaacct tcatgtgcga  1320
gtacgccgac gagacagcca tcgtgaa atttctgaac cggtggatct gaccttgcca  1380
gtccatcatc tctaccctga ctggtggcgg aggaagcggc ggaggcggat ctggcggcga  1440
aggtctgaa attgtgatga cccagtctcc tggcactctg tctctgtctc cggcgagag  1500
agctaccctg tcttgtagag ccagccagga cgtaacacc gctgtggctt ggtatcagca  1560
gaagcctgga caggccctc ggctgctgat ctactctgcc tctttctgt actccggcgt  1620
gcccgacaga ttctccggct ctagatctgg caccgacttc accctgacca tcaccagact  1680
```

```
ggaacccgag gacttcgcca cctactactg ccagcagcac tacaccacac cacctacctt    1740
tggccagggc accaagctgg aaatcaaagg tggtggcgga tcaggcggtg gcggtagcgg    1800
tggcggaggt tctacagacc agtgtgataa ttttcCCCaa atgctgaggg atctgcggga    1860
cgccttctct agggtcaaga cattttttca gacaaaggat gaactcgata acctcttgct    1920
caaagagagc ctgctcgagg actttaaggg atatctggga tgccaggctc tgagcgaaat    1980
gattcagttt tatttggagg aagtcatgcc tcaagcagaa aaccaggatc cagagattaa    2040
ggatcatgtc aacagcctcg gcgagaatct caagacactg cgcctgaggc tgagaagatg    2100
ccaccggttt ctgccttgtg aaaacaaaag caaggctgtc gagcagatta gaatgcttt    2160
taacaaactc caagaaaaag ggatctataa ggctatgtct gagtttgata tctttatcaa    2220
ttatatcgaa gcttatatga ctattaaggc tcgctagggg cccgtttaaa cccgctgatc    2280
agcctcgact gtgccttcta gtt                                            2303

SEQ ID NO: 11         moltype = AA  length = 733
FEATURE               Location/Qualifiers
REGION                1..733
                      note = DK210her2 (Variant 5)
source                1..733
                      mol_type = protein
                      organism = synthetic construct
SEQUENCE: 11
MGWSLILLFL VAVATRVHST DQCDNFPQML RDLRDAFSRV KTFFQTKDEL DNLLLKESLL     60
EDFKGYLGCQ ALSEMIQFYL EEVMPQAENQ DPEIKDHVNS LGENLKTLRL RLRRCHRFLP    120
CENKSKAVEQ IKNAFNKLQE KGIYKAMSEF DIFINYIEAY MTIKARGGGG SGGGGSGGGG    180
SQVQLQEWGA GLLKPSETLS LTCAASGFNI KDTYIHWVRQ PPGKGLEWVA RIYPTNGYTR    240
YADSVKGRFA ISADTSKNQA SLQMNSLRAE DTAVYYCSRW GGDGFYAMDY WGKGTTVTVS    300
SGGGGSGGGG SGGGGSAPTS SSTKKTQLQL EHLLLDLQMI LNGINNYKNP KLTRMLTFKF    360
YMPKKATELK HLQCLEEELK PLEEVLNLAQ SKNFHLRPRD LISNINVIVL ELKGSETTFM    420
CEYADETATI VEFLNRWITF CQSIISTLTG GGGSGGGGSG GGGSEIQMTQ SPSSLSLSPG    480
ERATLSCRAS QDVNTAVAWY QQKPGQAPRL LIYSASFLYS GVPDRFSGSR SGTDFTLTIS    540
SLQPEDFATY YCQQHYTTPP TFGQGTKLEI KGGGGSGGGG SGGGGSTDQC DNFPQMLRDL    600
RDAFSRVKTF FQTKDELDNL LLKESLLEDF KGYLGCQALS EMIQFYLEEV MPQAENQDPE    660
IKDHVNSLGE NLKTLRLRLR RCHRFLPCEN KSKAVEQIKN AFNKLQEKGI YKAMSEFDIF    720
INYIEAYMTI KAR                                                       733

SEQ ID NO: 12         moltype = DNA length = 2303
FEATURE               Location/Qualifiers
misc_feature          1..2303
                      note = DK210her2 Variant 5 Nucleic Acid Sequence
source                1..2303
                      mol_type = other DNA
                      organism = synthetic construct
SEQUENCE: 12
atcgaaatta atacgactca ctatagggag acccaagctg gctagcgccg ccaccatggg     60
atggtctttg atcctgctgt tcctggtggc cgtggctacc agagtgcatt ctaccgacca    120
gtgcgacaac ttcccctcaga tgctgcggga cctgagagat gccttctcca gagtgaaaac    180
attcttccag accaaggacg agctggacaa cctgctgctg aaaagtccc tgctggaaga    240
tttcaagggc tacctgggct gtcaggccct gtccgagatg atccagttct acctggaaga    300
agtgatgccc caggccgaga tcaggaccc cgagatcaag gaccacgtga actccctggg    360
cgagaacctg aaaaccctgc ggctgagact gcggcgtgc cacagatttc tgcccctgcga    420
gaacaagtcc aaggccgtgg aacagatcaa gaacgccttc aacaagctgc aagagaaggg    480
catctacaag gccatgagcg agttcgacat tttcatcaac tacatcgagg cctacatgac    540
catcaaggcc agaggcggcg gaggatctgg cggaggtgga agcggaggcg gtggatctca    600
ggtgcagttg caagaatggg gcgctggcct gctgaagcct tccgaaacac tgtctctgac    660
ctgcgccgcc agcggcttca acatcaagga cacctacatc cactgggtcc gacagcctcc    720
aggcaaagga ctggaatggg tcgccagaat ctaccccaca aacggctaca ccagatacgc    780
cgactctgtg aagggcagat tcgccatctc tgccgacacc tccaagaacc aggccagcct    840
gcagatgaac agcctgagag ctgaggacac cgccgtgtac tactgctcta tgggggcgg    900
agatggcttc tacgccatgg actattgggg caagggcacc accgtgacag ttagtagtgg    960
tggtggcggt agtggcggag cgggctcagg cggtggtgga tctgctccta catcctccag   1020
caccaagaaa acccagctgc agttggagca tctgctgctg gacctccaga tgatcctgaa   1080
cggcatcaac aactacaaga accccaagct gacccggatg ctgaccttca gttctacat    1140
gcccaagaag gccaccgagc tgaaaacatct gcagtgcctg gaaagggaac tgaagcccct   1200
cgaggaagtg ctgaatctgg cccagtccaa gaacttccac ctgaggccta gggacctgat   1260
ctccaacatc aacgtgatcg tgctcgagct gaagggctcc tcatgtcgca                1320
gtacgccgac gagacagcta ccatcgtgga atttctgaac cggtggatca ccttctgcca   1380
gtccatcatc tctaccctga ctggtggcgg aggaagcggc ggaggcggat ctggcggcgg    1440
aggctctgaa attcagatga cccagtctcc ttccagcctg tctctgtccc ctggcgagag    1500
agctaccctg tcttgtagag ccagccagga cgtgaacacc gctgtggctt ggtatcagca    1560
gaagcctgga caggcccctc ggctgctgat ctactctgcc tcctttctgt actccggcgt    1620
gcccgacaga ttctccggct ctagatcagg caccgacttt accctgacaa tcagctccct    1680
gcagcctgag gacttcgcca cctactactg ccagcagcac tacaccacac cacctacctt    1740
tggccagggc accaagctgg aaatcaaagg tggtggcgga tcaggcggtg gcggtagcgg    1800
tggcggaggt tctacagacc agtgtgataa ttttcCCCaa atgctgaggg atctgcggga    1860
cgccttctct agggtcaaga cattttttca gacaaaggat gaactcgata acctcttgct    1920
caaagagagc ctgctcgagg acttcaaggg atatctggga tgccaggctc tgagcgaaat    1980
gattcagttt tatttggagg aagtcatgcc tcaagcagaa aaccaggatc cagagattaa    2040
ggatcatgtc aacagcctcg gcgagaatct caagacactg agactgaggc tgcggagatg    2100
tcaccggttt ctgccttgtg aaaacaagag caaggctgtc gagcagatta gaatgcttt    2160
taacaaactc caagaaaaag ggatctataa ggctatgtct gagtttgata tctttatcaa    2220
```

```
ttatatcgaa gcttatatga ctattaaggc tcgctagggg cccgtttaaa cccgctgatc  2280
agcctcgact gtgccttcta gtt                                         2303

SEQ ID NO: 13           moltype = AA  length = 732
FEATURE                 Location/Qualifiers
REGION                  1..732
                        note = DK7DV07 EGFR
source                  1..732
                        mol_type = protein
                        organism = synthetic construct
SEQUENCE: 13
TDQCDNFPQM LRDLRDAFSR VKTFFQTKDE LDNLLLKESL LEDFKGYLGC QALSEMIQFY   60
LEEVMPQAEN QDPEIKDHVN SLGENLKTLR LRLRRCHRFL PCENKSKAVE QIKNAFNKLQ  120
EKGIYKAMSE FDIFINYIEA YMTIKARGGG GSGGGGSGGG GSQVQLQQWG AGLLKPSETL  180
SLTCAVYGFS LTNYGVHWIR QPPGKGLEWL GVIWSGGNTD YNTPFTSRVA ISKDNSKNQV  240
SLRLNSVTAA DTAIYYCARA LTYYDYEFAY WGKGTTVTVS SGGGGSGGGG SGGGGSDCDI  300
EGKDGKQYES VLMVSIDQLL DSMKEIGSNC LNNEFNFFKR HICDANKEGM FLFRAARKLR  360
QFLKMNSTGD FDLHLLKVSE GTTILLNCTG QVKGRKPAAL GEAQPTKSLE ENKSLKEQKK  420
LNDLCFLKRL LQEIKTCWNK ILMGTKEHGG GSGGGGSGG GGSEIVLTQS PGTLSLSPGE  480
RATLSCRASQ SIGTNIHWYQ QKPGQAPRLL IKYASESISG FPDRFSGSGS GTDFTLTITR  540
LEPEDFAMYY CQQNNNWPTT FGQGTKLEIK GGGGSGGGGS GGGGSTDQCD NFPQMLRDLR  600
DAFSRVKTFF QTKDELDNLL LKESLLEDFK GYLGCQALSE MIQFYLEEVM PQAENQDPEI  660
KDHVNSLGEN LKTLRLRLRR CHRFLPCENK SKAVEQIKNA FNKLQEKGIY KAMSEFDIFI  720
NYIEAYMTIK AR                                                     732

SEQ ID NO: 14           moltype = AA  length = 721
FEATURE                 Location/Qualifiers
REGION                  1..721
                        note = DK7DV07 HER2
source                  1..721
                        mol_type = protein
                        organism = synthetic construct
SEQUENCE: 14
TDQCDNFPQM LRDLRDAFSR VKTFFQTKDE LDNLLLKESL LEDFKGYLGC QALSEMIQFY   60
LEEVMPQAEN QDPEIKDHVN SLGENLKTLR LRLRRCHRFL PCENKSKAVE QIKNAFNKLQ  120
EKGIYKAMSE FDIFINYIEA YMTIKARGGG SGGGSGGGSQ VQLQQWGAGL LKPSETLSLT  180
CAVYGFNIKD TYIHWIRQPP GKGLEWLGRI YPTNGYTRYA DSVKGRVAIS KDNSKNQVSL  240
RLNSVTAADT AIYYCARWGG DGFYAMDYWG KGTTVTVSSG GGGSGGGGSG SDCDIEGKDG  300
KQYESVLMVS IDQLLDSMKE IGSNCLNNEF NFFKRHICDA NKEGMFLFRA ARKLRQFLKM  360
NSTGDFDLHL LKVSEGTTIL LNCTGQVKGR KPAALGEAQP TKSLEENKSL KEQKKLNDLC  420
FLKRLLQEIK TCWNKILMGT KEHGGGSGGG SGGGSEIVLT QSPGTLSLSP GERATLSCRA  480
SQDVNTAVAW YQQKPGQAPR LLIKSASFLY SGFPDRFSGS GSGTDFTLTI TRLEPEDFAM  540
YYCQQHYTTP PTFGQGTKLE IKGGGSGGGS GGGSTDQCD NFPQMLRDLRD AFSRVKTFFQ  600
TKDELDNLLL KESLLEDFKG YLGCQALSEM IQFYLEEVMP QAENQDPEIK DHVNSLGENL  660
KTLRLRLRRC HRFLPCENKS KAVEQIKNAF NKLQEKGIYK AMSEFDIFIN YIEAYMTIKA  720
R                                                                 721

SEQ ID NO: 15           moltype = AA  length = 722
FEATURE                 Location/Qualifiers
REGION                  1..722
                        note = DK7DV07 CD20
source                  1..722
                        mol_type = protein
                        organism = synthetic construct
SEQUENCE: 15
TDQCDNFPQM LRDLRDAFSR VKTFFQTKDE LDNLLLKESL LEDFKGYLGC QALSEMIQFY   60
LEEVMPQAEN QDPEIKDHVN SLGENLKTLR LRLRRCHRFL PCENKSKAVE QIKNAFNKLQ  120
EKGIYKAMSE FDIFINYIEA YMTIKARGGG SGGGSGGGSQ AYLQQSGAEL VRPGASVKMS  180
CKASGYTFTS YNMHWVKQTP RQGLEWIGAI YPGNGDTSYN QKFKGKATLT VDKSSSTAYM  240
QLSSLTSEDS AVYFCARVVY YSNSYWYFDV WGTGTTVTVS SGGGSGGGSG GGSDCDIEGK  300
DGKQYESVLM VSIDQLLDSM KEIGSNCLNN EFNFFKRHIC DANKEGMFLF RAARKLRQFL  360
KMNSTGDFDL HLLKVSEGTT ILLNCTGQVK GRKPAALGEA QPTKSLEENK SLKEQKKLND  420
LCFLKRLLQE IKTCWNKILM GTKEHGGGSG GGSGGGSIV LSQSPAILSA SPGEKVTMTC  480
RASSSVSYMH WYQQKPGSSP KPWIYAPSNL ASGVPARFSG SSGTSYSLT ISRVEAEDAA  540
TYYCQQWSFN PPTFGAGTKL ELKGGGSGGG SGGGSTDQCD NFPQMLRDLR DAFSRVKTFF  600
QTKDELDNLL LKESLLEDFK GYLGCQALSE MIQFYLEEVM PQAENQDPEI KDHVNSLGEN  660
LKTLRLRLRR CHRFLPCENK SKAVEQIKNA FNKLQEKGIY KAMSEFDIFI NYIEAYMTIK  720
AR                                                                722

SEQ ID NO: 16           moltype = AA  length = 735
FEATURE                 Location/Qualifiers
source                  1..735
                        mol_type = protein
                        organism = synthetic construct
REGION                  1..735
                        note = DK210 CD19
SEQUENCE: 16
ATMGWSLILL FLVAVATRVH STDQCDNFPQ MLRDLRDAFS RVKTFFQTKD ELDNLLLKES   60
LLEDFKGYLG CQALSEMIQF YLEEVMPQAE NQDPEIKDHV NSLGENLKTL RLRLRRCHRF  120
```

-continued

```
LPCENKSKAV EQIKNAFNKL QEKGIYKAMS EFDIFINYIE AYMTIKARGG GGSGGGGSGG  180
GGSQVQLQEW GAGLLKPSET LSLTCTVSGV SLPDYGVSWI RQPPGKGLEW LGVIWGSETT  240
YYNSALKSRV AISKDNSKNQ VSLRLNSVTA ADTAIYYCAK HYYYGGSYAM DYWGKGTTVT  300
VSSGGGGSGG GGSGGGGSAP TSSSTKKTQL QLEHLLLDLQ MILNGINNYK NPKLTRMLTF  360
KFYMPKKATE LKHLQCLEEE LKPLEEVLNL AQSKNFHLRP RDLISNINVI VLELKGSETT  420
FMCEYADETA TIVEFLNRWI TFCQSIISTL TGGGGSGGGG SGGGGSEIVM TQSPGTLSLS  480
PGERATLSCR ASQDISKYLN WYQQKPGQAV RLLIYHTSRL HSGVPDRFSG SGSGTDYTLT  540
ITRLEPEDFA TYFCQQGNTL PYTFGQGTKL EIKGGGGSGG GGSGGGGSTD QCDNFPQMLR  600
DLRDAFSRVK TFFQTKDELD NLLLKESLLE DFKGYLGCQA LSEMIQFYLE EVMPQAENQD  660
PEIKDHVNSL GENLKTLRLR LRRCHRFLPC ENKSKAVEQI KNAFNKLQEK GIYKAMSEFD  720
IFINYIEAYM TIKAR                                                   735

SEQ ID NO: 17          moltype = AA  length = 735
FEATURE                Location/Qualifiers
source                 1..735
                       mol_type = protein
                       organism = synthetic construct
REGION                 1..735
                       note = DK210 CD20
SEQUENCE: 17
MGWSLILLFL VAVATRVHST DQCDNFPQML RDLRDAFSRV KTFFQTKDEL DNLLLKESLL  60
EDFKGYLGCQ ALSEMIQFYL EEVMPQAENQ DPEIKDHVNS LGENLKTLRL RLRRCHRFLP  120
CENKSKAVEQ IKNAFNKLQE KGIYKAMSEF DIFINYIEAY MTIKARGGGG SGGGGSGGGG  180
SQAYLQQSGA ELVRPGASVK MSCKASGYTF TSYNMHWVKQ TPRQGLEWIG AIYPGNGDTS  240
YNQKFKGKAT LTVDKSSSTA YMQLSSLTSE DSAVYFCARV VYYSNSYWYF DVWGTGTTVT  300
VSSGGGGSGG GGSGGGGSAP TSSSTKKTQL QLEHLLLDLQ MILNGINNYK NPKLTRMLTF  360
KFYMPKKATE LKHLQCLEEE LKPLEEVLNL AQSKNFHLRP RDLISNINVI VLELKGSETT  420
FMCEYADETA TIVEFLNRWI TFCQSIISTL TGGGGSGGGG SGGGGSQIVL SQSPAILSAS  480
PGEKVTMTCR ASSSVSYMHW YQQKPGSSPK PWIYAPSNLA SGVPARFSGS GSGTSYSLTI  540
SRVEAEDAAT YYCQQWSFNP PTFGAGTKLE LKRGGGGSGG GGSGGGGSTD QCDNFPQMLR  600
DLRDAFSRVK TFFQTKDELD NLLLKESLLE DFKGYLGCQA LSEMIQFYLE EVMPQAENQD  660
PEIKDHVNSL GENLKTLRLR LRRCHRFLPC ENKSKAVEQI KNAFNKLQEK GIYKAMSEFD  720
IFINYIEAYM TIKAR                                                   735
```